US006628643B1

(12) United States Patent
Park et al.

(10) Patent No.: US 6,628,643 B1
(45) Date of Patent: Sep. 30, 2003

(54) METHOD FOR ELIMINATING SYNCHRONIZED CLOCKS IN DISTRIBUTED ROUTING APPROACHES THAT ARE DEPENDENT ON TEMPORAL ORDERING OF EVENTS

(75) Inventors: Vincent D. Park, Fairfax, VA (US); M. Scott Corson, Kensington, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/513,245

(22) Filed: Feb. 25, 2000

Related U.S. Application Data

(63) Continuation-in-part of application No. 09/266,868, filed on Mar. 12, 1999.
(60) Provisional application No. 60/078,023, filed on Mar. 14, 1998.

(51) Int. Cl.[7] .............................................. H04L 12/28
(52) U.S. Cl. ..................... 370/351; 370/400; 370/254
(58) Field of Search ............................... 370/254, 255, 370/256, 351, 400; 709/238, 239, 240, 241, 243

(56) References Cited

U.S. PATENT DOCUMENTS 5,754,532 A * 5/1998 Dev et al. .................. 370/250

OTHER PUBLICATIONS

Corson et al., Architectural Considerations for Mobile Mesh Networking, May 1996, available at http://tonnant.itd.nrl.navy.mil/mmnet/mmnetRFC.txt.*

O'Neill et al., Routing and handoff in the edge mobility architecture, 2000, ACM Press, Volumn 4, No. 4, pp. 54–66.*

Corson et al., A distributed routing algorithm for mobile wireless networks, Aug. 4, 1995, J.C. Baltzer AG, Science Publishers, Wireless Networks I (1995), pp. 61–81.*

* cited by examiner

*Primary Examiner*—Chau Nguyen
*Assistant Examiner*—Keith M. George
(74) *Attorney, Agent, or Firm*—John J. Karasek; John Gladstone Mills III

(57) ABSTRACT

A routing system and method utilizes a highly-adaptive, loop-free, distributed routing algorithm for dynamic networks, which can be used in networks in which the clocks are not synchronized. The invention is adapted for use when clocks are not synchronized. If a node has no downstream links, a height value for the node is updated in a manner which ensures the reversal of the direction at least one of the incident links, ensuring proper routing to the destination even in the absence of synchronized clocks.

14 Claims, 22 Drawing Sheets

Link (A,C) fails

Node A defines a new reference level, fails to reverse directions of adjacent links (A,B) and (A,D)

EXAMPLE MODIFICATION OF THE TEMPORALLY-ORDERED ROUTING ALGORITHM TO ELIMINATE THE REQUIREMENT FOR SYNCHRONIZED CLOCKS.

METHOD FOR ELIMINATING SYNCHRONIZED CLOCKS IN DISTRIBUTED ROUTING APPROACHES THAT ARE DEPENDENT ON TEMPORAL ORDERING OF EVENTS

This application is a continuation-in-part of U.S. patent application Ser. No. 09/266,868, filed on Mar. 12, 1999 for Matthew Scott Corson and Vincent Douglas Park, which claims priority from the U.S. provisional application Ser. No. 60/078,023, filed on Mar. 14, 1998.

BACKGROUND OF THE INVENTION

1. Field of the Invention

The present invention is directed to a highly-adaptive, loop-free, distributed routing algorithm which does not require synchronized clocks, for use in dynamic networks. The invention utilizes one of a family of algorithms which is known as a "link reversal" algorithm. The invention structures reactions as a temporally-ordered sequence of diffusing computations, with each computation including a sequence of directed link reversals. The invention is well suited for use in large, dynamic, bandwidth constrained networks. In such networks, rapid route maintenance with a minimum of communication overhead provides higher performance.

2. Description of the Related Art

Traditionally, practical datagram routing algorithms are designed for operation in static or quasi-static networks with hardwired links. In such networks bandwidth is relatively abundant, and the protocol design goals involve minimization of router state (to permit scalability) and rapid reaction to topological changes when they occur (to ensure good data routing performance). In other words, limiting protocol storage and time complexity are the primary design goals.

Distance-vector routing algorithms based on the distributed BellmannFord (BF) computation, such as the Routing Information Protocol (RIP) were among the earliest approaches. However, these approaches suffered from the well-known "counting-to-infinity" problem that affected the time complexity (i.e., convergence times) of these protocols. There has been a large amount of theoretical and practical work seeking to remedy this problem and improve the performance of distance-vector approaches. The development of link state routing algorithms provided an alternative approach, in which the entire network topology is distributed to all nodes, allowing each router to independently compute paths to every destination. However, nearly all of this work continued in the direction started by the BF work and focused on the problem of "shortest-path" routing. Shortest path routing techniques seek to route traffic over the "least cost" path to the destination (often times the shortest path measured in hop count), an approach that optimal routing theory indicates is favorable during periods of light traffic. One aspect inherent in this work is that supporting a shortest-path computation requires a certain amount of communication complexity within the routing protocol. This, in turn, requires that sufficient bandwidth be available in the network to enable the computation while still leaving enough bandwidth for actual data routing.

The invention considers the problem of routing in a dynamic network. An example of such a network is a mobile, multi-hop, wireless network which can be envisioned as a collection of routers (equipped with wireless receiver/transmitters) that are free to move about arbitrarily. The status of the communication links between the routers, at any given time, is a function of their positions, transmission power levels, antenna patterns, co-channel interference levels, and other time-varying factors. Thus, the mobility of the routers and variability of other connectivity factors result in a network with a potentially rapidly and unpredictably changing topology. Congested links are also an expected characteristic of such a network, as wireless links inherently have significantly lower capacity than their hardwired counterparts and are therefore more prone to congestion. The highly dynamic and bandwidth constrained nature of mobile networks most dramatically alters the trade-offs to be made in protocol design. Thus, it is communication complexity, not storage complexity, that is the greater determinant of protocol scalability in these networks. The combination of network size, topology dynamics and available bandwidth determines when approaches that do not perform shortest-path routing may be more desirable.

One embodiment of a temporally ordered routing algorithm, which is described in U.S. patent application Ser. No. 09/266,868, filed on Mar. 12, 1999, requires that nodes have clocks which are synchronized with each other in order to perform error-free routing. Dynamic, mobile networks such as those in which this algorithm is used may lose clock synchronization in one or more nodes. A routing method which would provide error free routing in the absence of synchronized clocks would be very useful. Such a method has been developed and is disclosed herein.

SUMMARY OF THE INVENTION

A routing algorithm which is well-suited for operation in a relatively dynamic or bandwidth-constrained networking environment, for example a mobile wireless networking environment, should therefore possess the following attributes:

Executes distributedly

Provides loop-free routes

Provides multiple routes (to alleviate congestion)

Establishes routes quickly (so they may be used before the topology changes)

Minimizes communication overhead by localizing algorithmic reaction to topological changes when possible (to conserve available bandwidth and increase scalability)

Based on these attributes, the inventors have developed a method referred to as the Temporally Ordered Routing Algorithm (TORA) which is a new routing method that is tailored for operation in a highly-dynamic networking environment, such as a mobile network. TORA's design is based largely on the notion that high reactivity (i.e., low time complexity) and bandwidth conservation (i.e., low communication complexity) are of greater importance than routing optimality (i.e., determination of the shortest-path). A key concept in its design is an attempt to decouple (to the greatest extent possible) the generation of potentially far-reaching control message propagation from the dynamics of the network topology. The "scope" of control messaging following topological changes is typically localized to a very small set of nodes near the change without having to resort to a dynamic, hierarchical routing solution with its attendant complexity. A possible enhancement to the protocol (to be discussed later) would be to embed farther-reaching control message propagation into the protocol as a secondary mechanism. This propagation would occur periodically at a very low rate, independent of the network topology dynamics, and would be employed as a means of infrequent route optimization and soft-state route verification.

TORA is distributed, in that nodes need only maintain information about adjacent nodes (i.e., one-hop knowledge). Like a distance-vector routing algorithm, TORA maintains state on a per-destination basis. This property is exploited in the design by establishing routing for each given destination on-demand, since it may not be necessary (nor desirable) to maintain routes between every source/destination pair at all times. The overhead expended to establish a route between a given source/destination pair will be wasted if the source does not require the route prior to its invalidation due to topological changes. Thus, TORA is "source initiated" and creates a set of routes to a given destination only when there is message traffic for that destination. It guarantees all routes are loop-free, and typically provides multiple routes for any source/destination pair that requires a route. Since having a single route is sufficient, many topological changes require no algorithmic reaction. Following topological changes that do require reaction, the protocol quickly re-establishes valid routes. This ability to initiate and react infrequently serves to further minimize communication overhead. Finally, in the event of a network partition, the protocol detects the partition and erases all invalid routes.

While not described here, TORA may be easily modified to run in a traditional pro-active, "destination-initiated" mode where all nodes actively maintain routing to a given destination (presumably a "frequent destination" for many nodes), thereby removing the need for source-initiated, on-demand route creation.

This original TORA embodiment, which is also described in U.S. patent application Ser. No. 09/266,868, requires that all nodes have synchronized clocks.

In a new embodiment of the TORA routing algorithm disclosed herein, the TORA algorithm does not require synchronized clocks in order to perform error free routing to a given destination.

BRIEF DESCRIPTION OF THE DRAWINGS

FIG. 7 is a flow chart which illustrates initialization.

FIG. 8 is a flow chart which illustrates the steps following activation of a new link k.

FIG. 9 is a flow chart which illustrates the steps following failure of a link k.

FIG. 10 is a flow chart which illustrates the steps following receipt of a query control packet.

FIG. 11 is a flow chart which illustrates the steps following receipt of an update control packet.

FIG. 12 is a flow chart which illustrates the steps following receipt of a clear control packet.

FIG. 13 is a flow chart which is a continuation of FIG. 12.
FIG. 14 is a flow chart which is a continuation of FIG. 12.
FIG. 15 is a flow chart which is a continuation of FIG. 12.
FIG. 16 is a flow chart which illustrates the steps following receipt of a data packet.

DETAILED DESCRIPTION OF THE PREFERRED EMBODIMENTS

Figure 1:
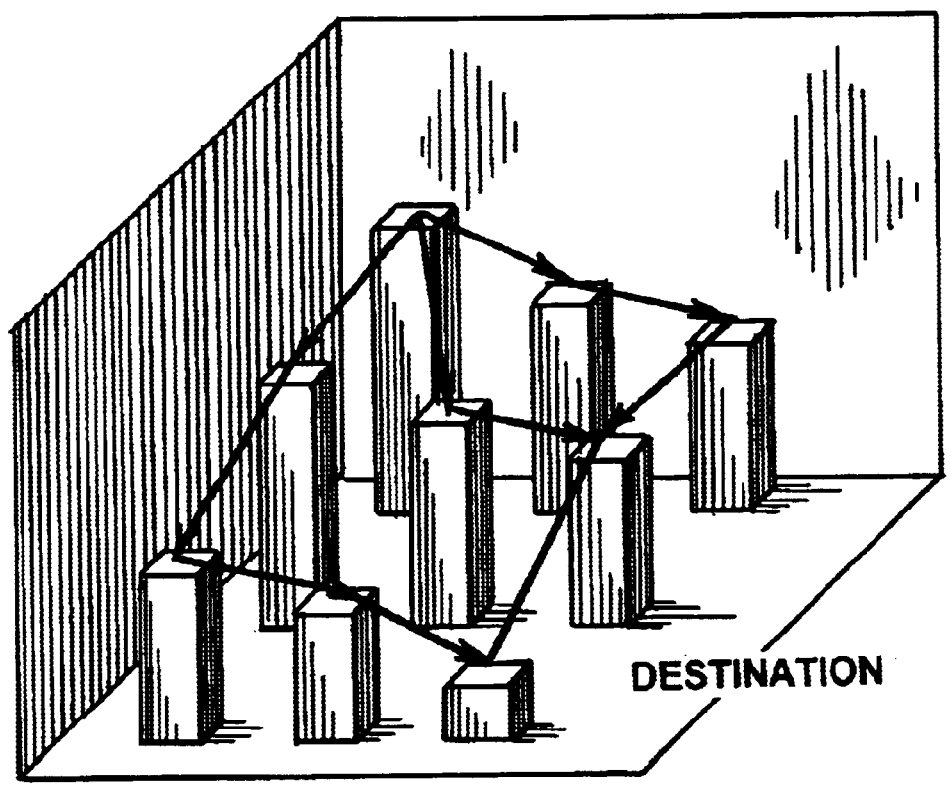
FIG. 1 is a conceptual illustration of a directed acyclic graph (DAG) formed by routers having relative heights according to the invention.
Figure 2A:
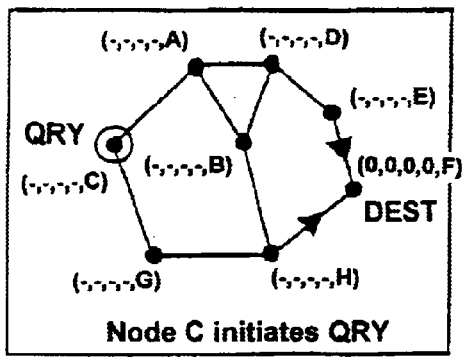
FIGS. 2(a)–2(f) illustrate an example of creating routes according to the invention.
Figure 2B:
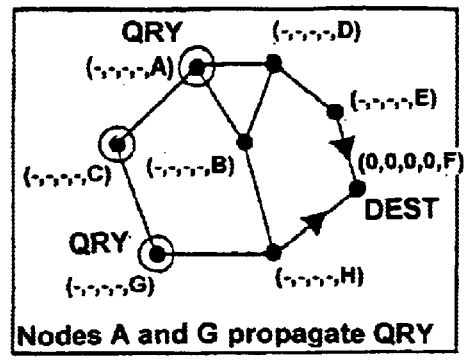
Figure 2C:
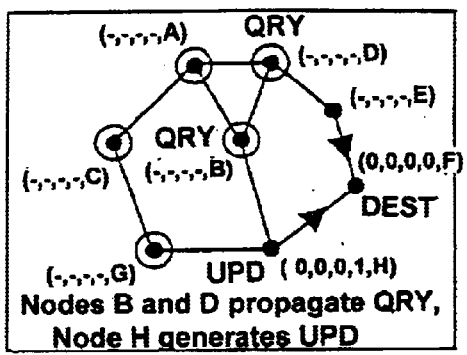
Figure 2D:
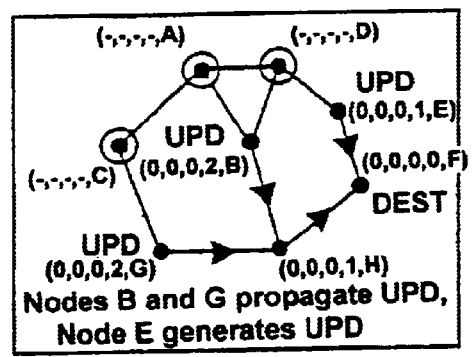
Figure 2E:
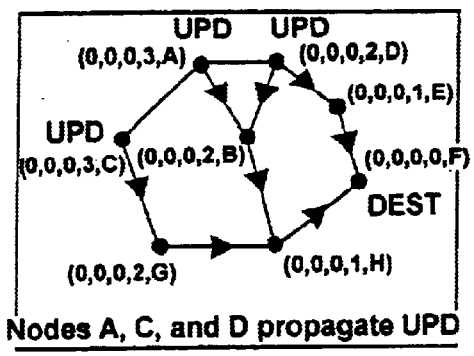
Figure 2F:
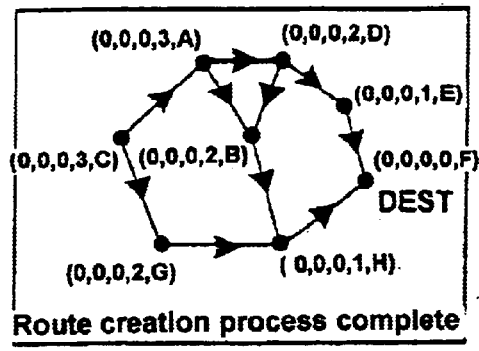

A logically separate version of the invention is run for each destination to which routing is required. For simplicity and ease of understanding, the following discussion focuses on a single version running for a given destination, a network such as a mobile network. The protocol can be separated into three basic functions: creating routes, maintaining routes, and erasing routes. During route creation and maintenance, nodes use a metric (which can be thought of as a "height") to establish a directed acyclic graph (DAG) rooted only at the destination (FIG. 1). Links are assigned a direction ("upstream" or "downstream") based on the relative heights of neighboring nodes, i.e., they are directed from higher to lower. The significance of the heights and the link directional assignments is that a node may only route information (i.e., forward message packets) downstream (i.e., to a lower neighboring node). Links to neighboring nodes with an unknown or "null" height are considered undirected and cannot be used for routing. Thus, the creating routes process essentially corresponds to the selection of node heights to form a directed sequence of links leading to the destination in a previously undirected network or portion of the network. Following a topological change (e.g., the loss of some node's last downstream link), some directed paths may no longer lead to the destination (i.e., the DAG may no longer be rooted only at the destination). The maintaining routes process proceeds as a sequence of directed link reversals (caused by a re-selection of node heights) which re-orients the DAG such that all directed paths again lead to the destination. Two algorithms, which are members of a general class of algorithms designed to accomplish this task, are presented in E. Gafni and D. Bertsekas, DISTRIBUTED ALGORITHMS FOR GENERATING LOOP-FREE ROUTES IN NETWORKS WITH FREQUENTLY CHANGING TOPOLOGY, IEEE Trans. Commun. (January 1981) (the contents of this paper are hereby incorporated by reference). However, these algorithms are designed for operation in non-partitioned networks. Due to the undesirable behavior exhibited by these algorithms in portions of the network that become partitioned from the destination, they are deemed unacceptable for practical use. The method of the present invention incorporates an algorithm in the same general class, which is more efficient in reacting to topological changes and capable of detecting a network partition. This leads to the third function, erasing routes. Route erasure is initiated when a node perceives that it has detected a network partition. During this process, nodes set their heights to null and their adjacent links become undirected.

The protocol accomplishes these three functions through the use of three distinct control packets: query (QRY), update (UPD), and clear (CLR). QRY packets are used for creating routes, UPD packets are used for both creating and maintaining routes, and CLR packets are used for erasing routes.

A network can be modeled as a graph G=(N, L), where N is a finite set of nodes and L is a set of initially undirected links. Each node i∈N is assumed to have a unique node identifier (ID), and each link (i, j)∈L is assumed to allow two-way communication (i.e., nodes connected by a link can communicate with each other in either direction). The set of links L is changing with time (i.e., new links can be established and existing links can be severed). From the perspective of neighboring nodes, a node failure is equivalent to severing all links incident to that node. Each initially undirected link (i, j)∈L may subsequently be assigned one of three states; (1) undirected, (2) directed from node i to node j, or (3) directed from node j to node i. If a link (i, j)∈L is directed from node i to node j, node i is said to be "upstream" from node j while node j is said to be "downstream" from node i.

For each node i, the "neighbors" of i, $N_i \in N$, is defined to be the set of nodes j such that (i, j)∈L. For the subsequent discussion, a lower-level protocol, which ensures that each node i is always aware of its neighbors in the set $N_i$, is assumed to exist. It is also assumed that all control packets are sent to all neighbors in the set N, and are received correctly within a finite time and in order of transmission.

At any given time, an ordered quintuple $H_i=(\tau_i, oid_i, r_i, \delta_i, i)$ is associated with each node i∈N. Conceptually, the quintuple associated with each node represents the height of the node as defined by two parameters: a reference level, and a delta with respect to the reference level. The reference level is represented by the first three values in the quintuple, while the delta is represented by the last two values. A new reference level is defined each time a node loses its last downstream link due to a link failure. The first value representing the reference level, $\tau_i$, is a time tag set to the "time" of the link failure. This could be accomplished via interface with an external time source such as the Global Positioning System (GPS) or through use of an algorithm such as the Network Time Protocol. Other methods of creating time tags are also possible. Instead of a physical clock, a logical clock may be used to create the time tag, for example. This time tag need not actually indicate or be "time," so long as it correctly establishes the temporal order of link failure in the network to within the precision of the time tag value. In the embodiment of the invention disclosed in patent application Ser. No. 09/266,868, it is assumed that all nodes have synchronized clocks.

A new embodiment of the invention, discussed in a later section relaxes the requirement that the time tag, $\tau_i$, must correctly maintain the relative temporal order of events, and eliminates the requirement for synchronized clocks.

The second value, $oid_i$, is the originator ID (i.e., the unique ID of the node which defined the new reference level). This ensures that the reference levels can be totally ordered lexicographically, even if multiple nodes define reference levels due to failures which occur simultaneously (i.e., with equal time tags). The third value, $r_i$, is a single bit used to divide each of the unique reference levels into two unique sub-levels. This bit is used to distinguish between the "original" reference level and its corresponding, higher "reflected" reference level. When a distinction is not required, both original and reflected reference levels will simply be referred to as "reference levels." The first value representing the delta, $\delta_i$, is an integer used to order nodes with respect to a common reference level. This value is instrumental in the propagation of a reference level. How $\delta_i$ is selected will be clarified in a subsequent section.

Finally, the second value representing the delta, i, is the unique ID of the node itself. This ensures that nodes with a common reference level and equal values of $\delta_i$ (and in fact all nodes) can be totally ordered lexicographically at all times.

Each node i (other than the destination) maintains its height, $H_i$. Initially the height of each node in the network (other than the destination) is set to NULL, $H_i=(-, -, -, -, i)$. Subsequently, the height of each node i can be modified in accordance with the rules of the protocol. The height of the destination is always ZERO, $H_{did}=(0, 0, 0, 0, did)$, where did is the destination-ID (i.e., the unique ID of the destination for which the algorithm is running). In addition to its own height, each node i maintains a height array with an entry $HN_{ij}$ for each neighbor j∈$N_i$. Initially the height of each neighbor is set to NULL, $HN_{ij}=(-, -, -, -, j)$. If the destination is a neighbor of i (i.e., did∈$N_i$), node i sets the height entry of the destination to ZERO, $HN_{i,did}=(0, 0, 0, 0, did)$.

Each node i (other than the destination) also maintains a link-state array with an entry $LS_{ij}$ for each link (i, j)∈L, where j∈$N_i$. The state of the links is determined by the heights $H_i$ and $HN_{ij}$, and is directed from the higher node to the lower node. If a neighbor j is higher than node i, the link is marked upstream (UP). If a neighbor j is lower than node i, the link is marked downstream (DN). If the neighbor's height entry, $HN_{ij}$, is NULL, the link is marked undirected (UN). Finally, if the height of node i is NULL, then any neighbor's height which is not NULL is considered lower, and the corresponding link is marked downstream (DN). When a new link (i, j)∈L is established (i.e., node i has a new neighbor j∈$N_i$), node i adds entries for the new neighbor to the height and link-state arrays. If the new neighbor is the destination, the height entry is set to ZERO, $HN_{i,did}=(0, 0, 0, 0, did)$; otherwise it is set to NULL, $HN_{ij}=(-, -, -, -, j)$. The corresponding link-state, $LS_{ij}$, is set as outlined above. Nodes need not communicate any routing information (e.g., exchange heights) upon link activation.

Creating routes requires use of the QRY and UPD packets. A QRY packet consists of a destination-ID (did), which identifies the destination for which the algorithm is running. An UPD packet consists of a did, and the height of the node i that is broadcasting the packet, $H_i$.

Each node i (other than the destination) maintains a route-required flag, $RR_i$, which is initially unset. Each node i (other than the destination) also maintains the time at which the last UPD packet was broadcast, and the time at which each link (i, j)∈L, where j∈$N_i$, became active.

When a node with no directed links and an unset route-required flag requires a route to the destination (i.e., has message traffic for the destination), it broadcasts a QRY packet and sets its route-required flag.

When a node i receives a QRY packet, it reacts as follows:

(a) If the route-required flag of the receiving node is set, it discards the QRY packet.

(b) If the route-required flag of the receiving node is not set and its height is non-NULL with r=0, it first compares the time the last UPD packet was broadcast to the time the link over which the QRY packet was received became active. If an UPD packet has been broadcast since the link became active, it discards the QRY packet; otherwise, it broadcasts an UPD packet that contains its current height.

(c) If the route-required flag of the receiving node is not set and its height is either NULL, or non-NULL with r=1, but it has a neighbor node whose height is non-NULL with r=0, it sets its height to $H_i=(\tau_j, oid_j, r_j, \delta_j+1, i)$, where $HN_{ij}=(\tau_j, oid_j, r_j, \delta_j, j)$ is the minimum height of its non-NULL neighbors with r=0, updates all the entries in its link-state array LS and broadcasts an UPD packet which contains its new height.

(d) If none of the above conditions hold true, the receiving node re-broadcasts the QRY packet and sets its route-required flag.

If a node has the route-required flag set when a new link is established, it broadcasts a QRY packet.

When a node i receives an UPD packet from a neighbor $j \in N_i$, node i first updates the entry $HN_{ij}$ in its height array with the height contained in the received UPD packet and then reacts as follows:

(a) If the route-required flag of the receiving node is set and the height contained in the received UPD packet is non-NULL with r=0, it sets its height to $H_i = (\tau_j, oid_j, r_j, \delta_j+1, i)$, where $HN_{ij} == (\tau_j, oid_j, r_j, \delta_j, j)$ is the height contained in the received UPD packet, updates all the entries in its link-state array LS, unsets the route-required flag and broadcasts an UPD packet that contains its new height.

(b) If the above condition does not hold true, the receiving node simply updates the entry $LS_{ij}$ in its link-state array.

The section on maintaining routes discusses the additional reaction that occurs if (b) results in loss of the last downstream link due to a link reversal.

An example of the creating routes process is illustrated in FIGS. 2(a)–2(f). The respective heights are shown adjacent to each node, and the destination for which the algorithm is running is marked DEST. A circle around a node indicates that its route-required flag is set. Recall that the last value in each height is the unique ID of the node, and that lexicographical ordering (where 0<1<2 . . . and A<B<C . . . ) is used to direct links. Note that the height selected for node D in FIG. 2(e) reflects an arbitrary assumption that node D received the UPD packet from node E prior to the packet from node B. Had node D instead selected a height in response to the packet from node B, the direction of link (A, D) in FIG. 2(f) would have been reversed.

Maintaining routes is only performed for nodes that have a height other than NULL. Furthermore, any neighbor's height which is NULL is not used in the computations. A node i is said to have no downstream links if $H_i < HN_{ij}$ for all non-NULL neighbors $j \in N_i$. This will result in one of five possible reactions depending on the state of the node and the preceding event (e.g., topological change or packet reception). Each node (other than the destination) that has no downstream links modifies its height, $H_i = (\tau_i, oid_i, r_i, \delta_i, i)$, as follows:

Case 1 (Generate):

Node i has no downstream links (due to a link failure).

$(\tau_i, oid_i, r_i) = (t, i, 0)$, where t is the time of the failure $(\delta_i, i) = (0, i)$ In essence, node i defines a new reference level. The above assumes node i has at least one upstream neighbor. If node i has no upstream neighbors, it simply sets its height to NULL.

Case 2 (Propagate):

Node i has no downstream links, and the ordered sets $(\tau_j, oid_j, r_j)$ are not equal for all $j \in N_i$.

$(\tau_j, oid_j, r_j) = \max\{(\tau_j, oid_j, r_j) | j \in N_i\}$ $(\delta_i, i) = \left( \min\left\{ \delta_j \middle| \begin{array}{l} j \in N_i \text{ with } (\tau_j, oid_j, r_j) \\ = \max\{(\tau_j, oid_j, r_j)\} \end{array} \right\} - 1, i \right)$ In essence, node i propagates the reference level of its highest neighbor and selects a height that is lower than all neighbors with that reference level.

Case 3 (Reflect):

Node i has no downstream links, and the ordered sets $(\tau_j, oid_j, r_j)$ are equal with $r_j=0$ for all $j \in N_i$.

$(\tau_i, oid_i, r_i) = (\tau_j, oid_j, 1)$ $(\delta_i, i) = (0, i)$

In essence, the same reference level (which has not been "reflected") has propagated to node i from all of its neighbors. Node i "reflects" back a higher sub-level by setting the bit r.

Case 4 (Detect):

Node i has no downstream links, the ordered sets $(\tau_j, oid_j, r_j)$ are equal with $r_j=1$ for all $j \in N_i$, and $oid_j=i$ (i.e., node i defined the level).

$(\tau_i, oid_i, r_i) = (-, -, -,)$ $(\delta_i, i) = (-, i)$

In essence, the same reference level (which has been "reflected") has propagated to node i from all of its neighbors, and the reference level was defined by node i. This corresponds to detection of a partition. Node i must initiate the process of erasing invalid routes (which are not rooted at the destination) as discussed later.

Case 5 (Generate):

Node i has no downstream links, the ordered sets $(\tau_j, oid_j, r_j)$ are equal with $r_j=1$ for all $j \in N_i$, and $oid_j$ does not equal i (i.e., node i did not define the level).

$(\tau_i, oid_i, r_i) = (t, i, 0)$ $(\delta_i, i) = (0, i)$

In essence, the same reference level (which has been "reflected") has propagated to node i from all of its neighbors, but the reference level was not defined by node i. This is not necessarily an indication of a partition. Node i defines a new reference level.

Figure 3:
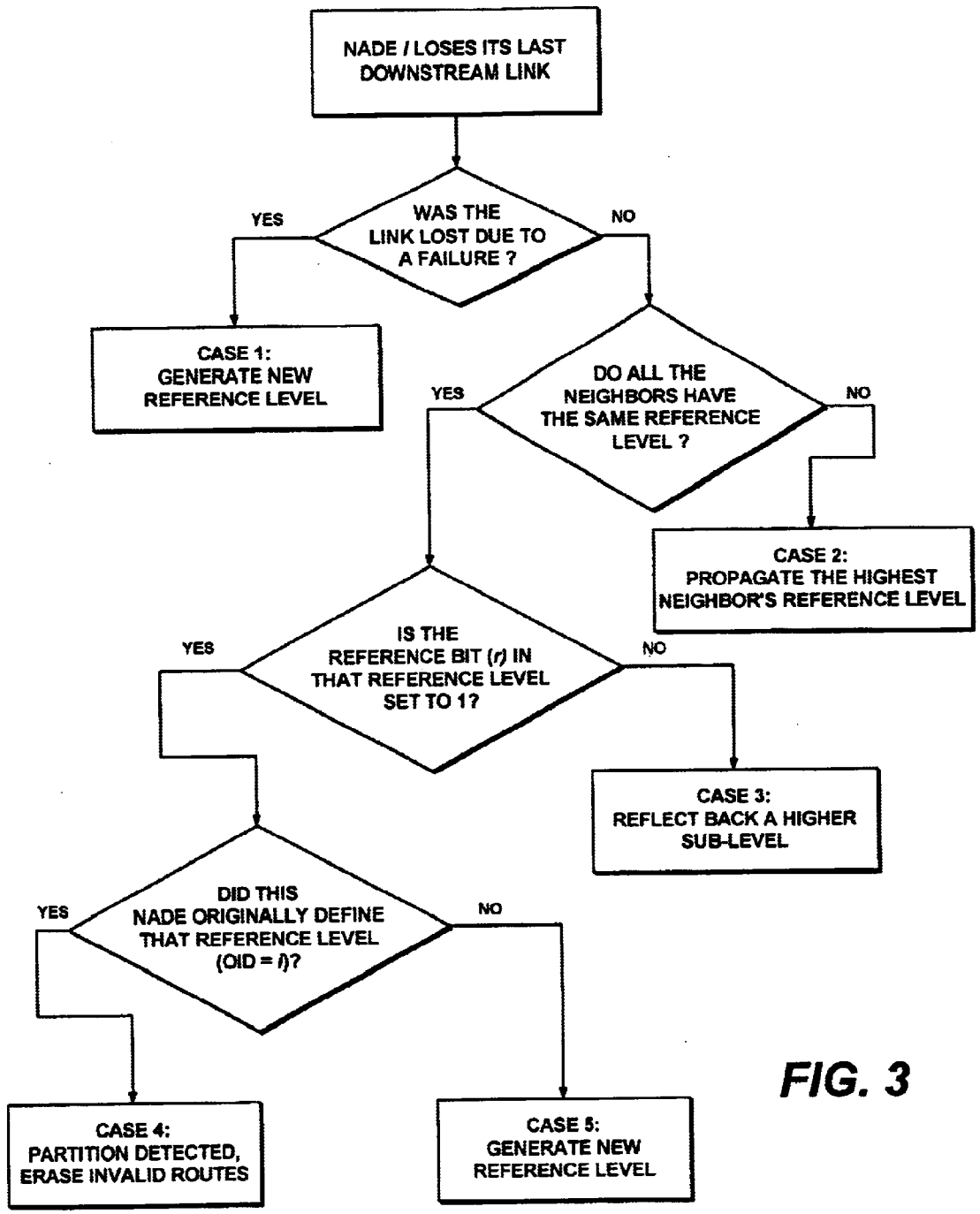
FIG. 3 illustrates a decision tree for maintaining routes according to the invention.

Following determination of its new height in cases 1, 2, 3, and 5, node i updates all the entries in its link-state array LS, and broadcasts an UPD packet to all neighbors $j \in N_i$. The UPD packet consists of a did, and the new height of the node i which is broadcasting the packet, $H_i$. When a node i receives an UPD packet from a neighbor $j \in N_i$, node i first reacts as described in the prior description of creating routes. If the initial processing causes a link reversal and node i loses its last downstream link, then it modifies its height as outlined in the cases above. FIG. 3 summarizes these five cases in the form of a decision tree, starting from the time a node loses its last downstream link. In the event node i loses a link $(i, j) \in L$, which is not its last downstream link, node i simply removes the entries $HN_{ij}$ and $LS_{ij}$ in its height and link-state arrays.

Figure 4A:
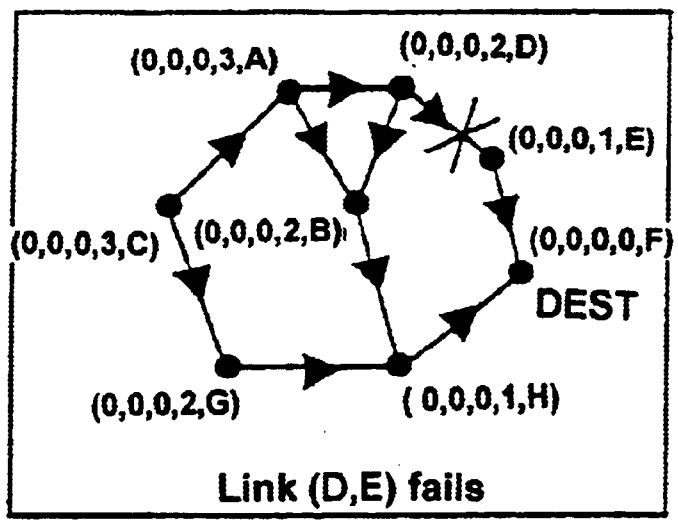
FIGS. 4(a) and 4(b) illustrate an example of a link failure not requiring a reaction.
Figure 4B:
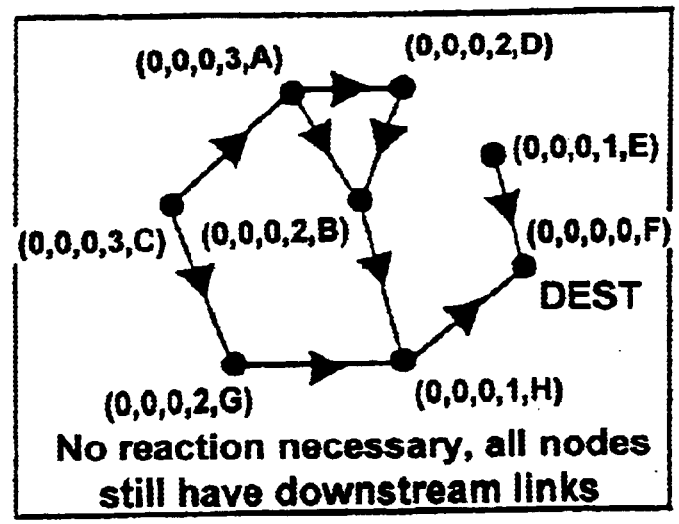
Figure 5A:
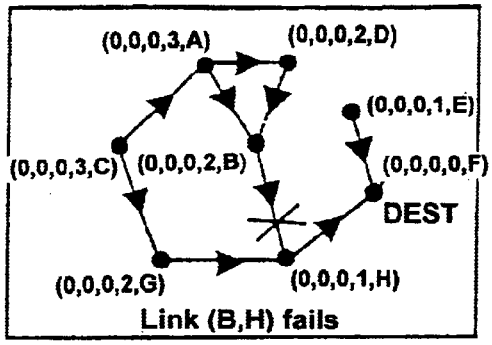
FIGS. 5(a)–5(e) illustrate an example of maintaining routes following a link failure which does require a reaction.
Figure 5B:
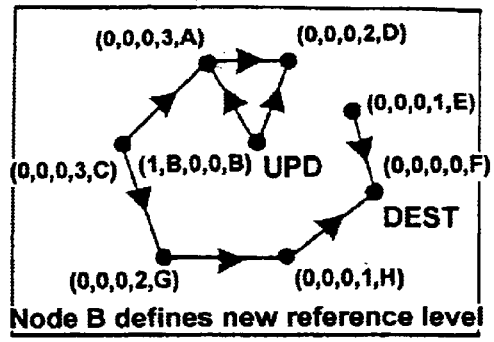
Figure 5C:
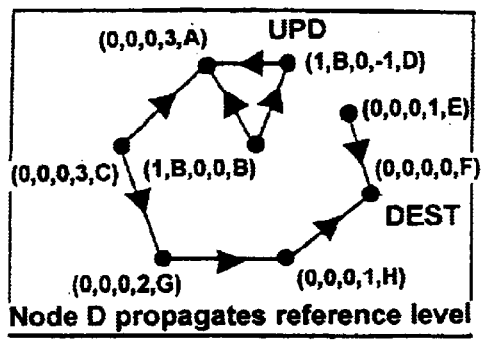
Figure 5D:
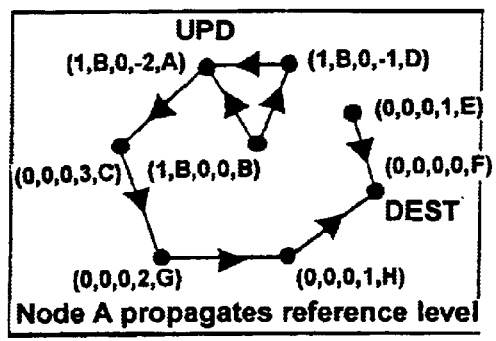
Figure 5E:
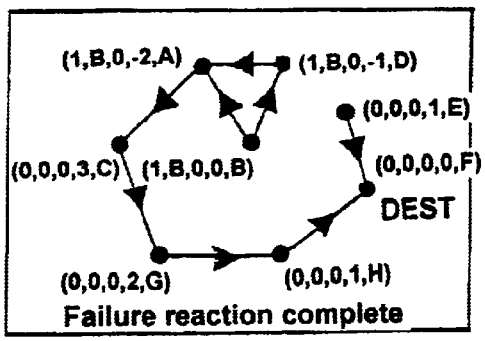
Figure 6A:
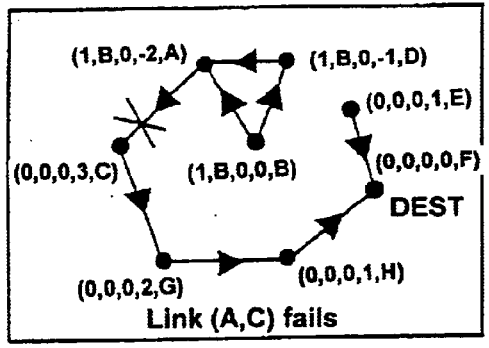
FIGS. 6(a)–6(h) illustrate an example of maintaining and erasing routes according to the invention, following a link failure which partitions the network.
Figure 6B:
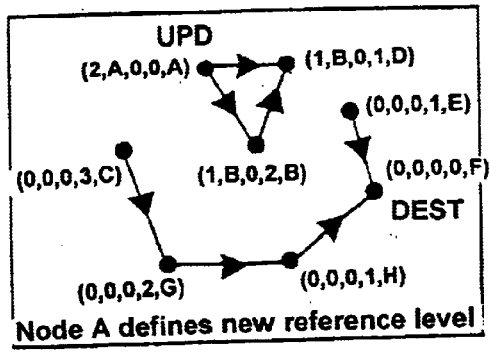
Figure 6C:
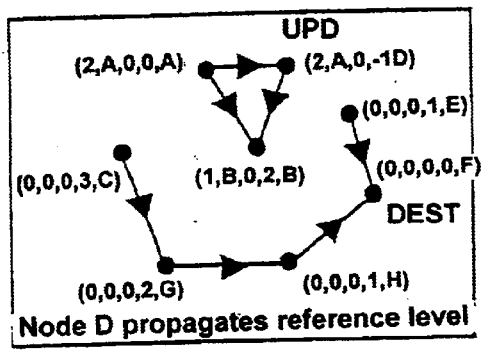
Figure 6D:
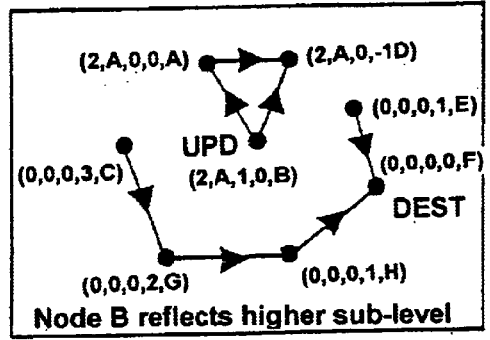
Figure 6E:
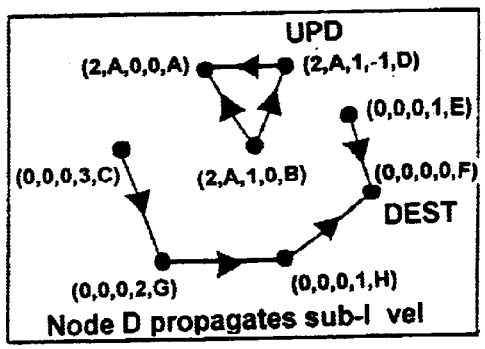
Figure 6F:
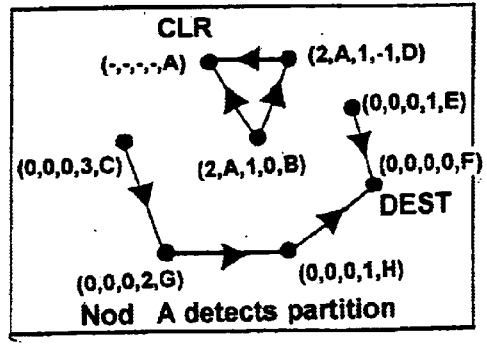
Figure 6G:
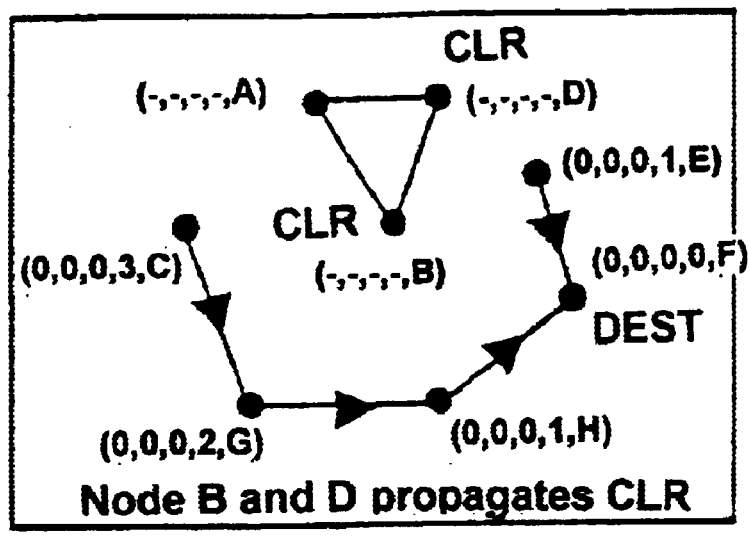
Figure 6H:
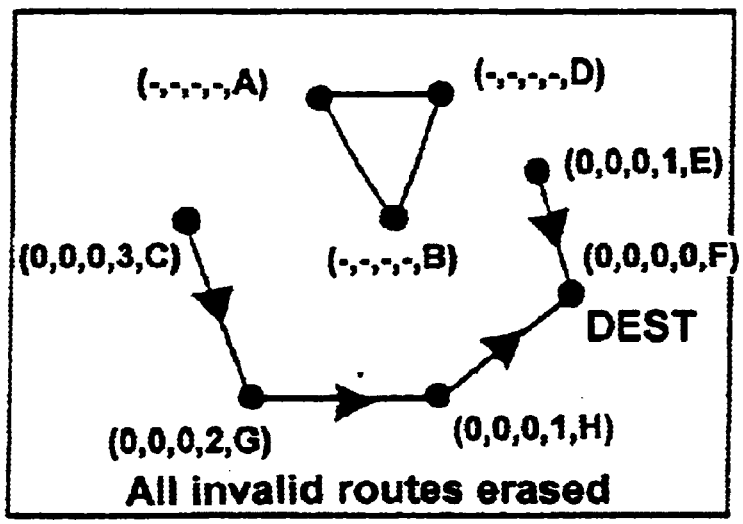
Figure 7:
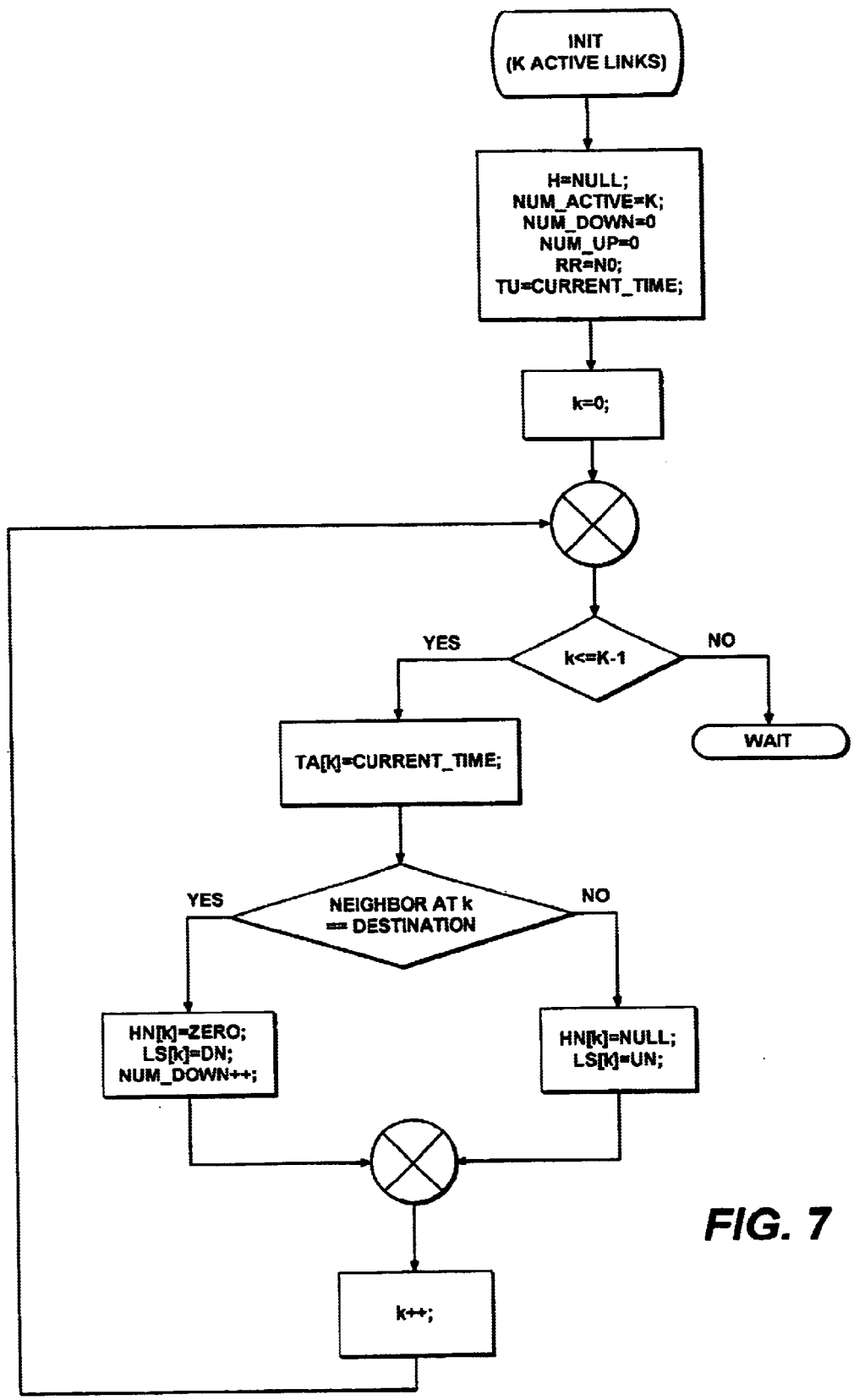
FIGS. 7–16 are flow charts illustrating an implementation of a protocol of the temporally ordered routing algorithm according to the invention.
Figure 8:
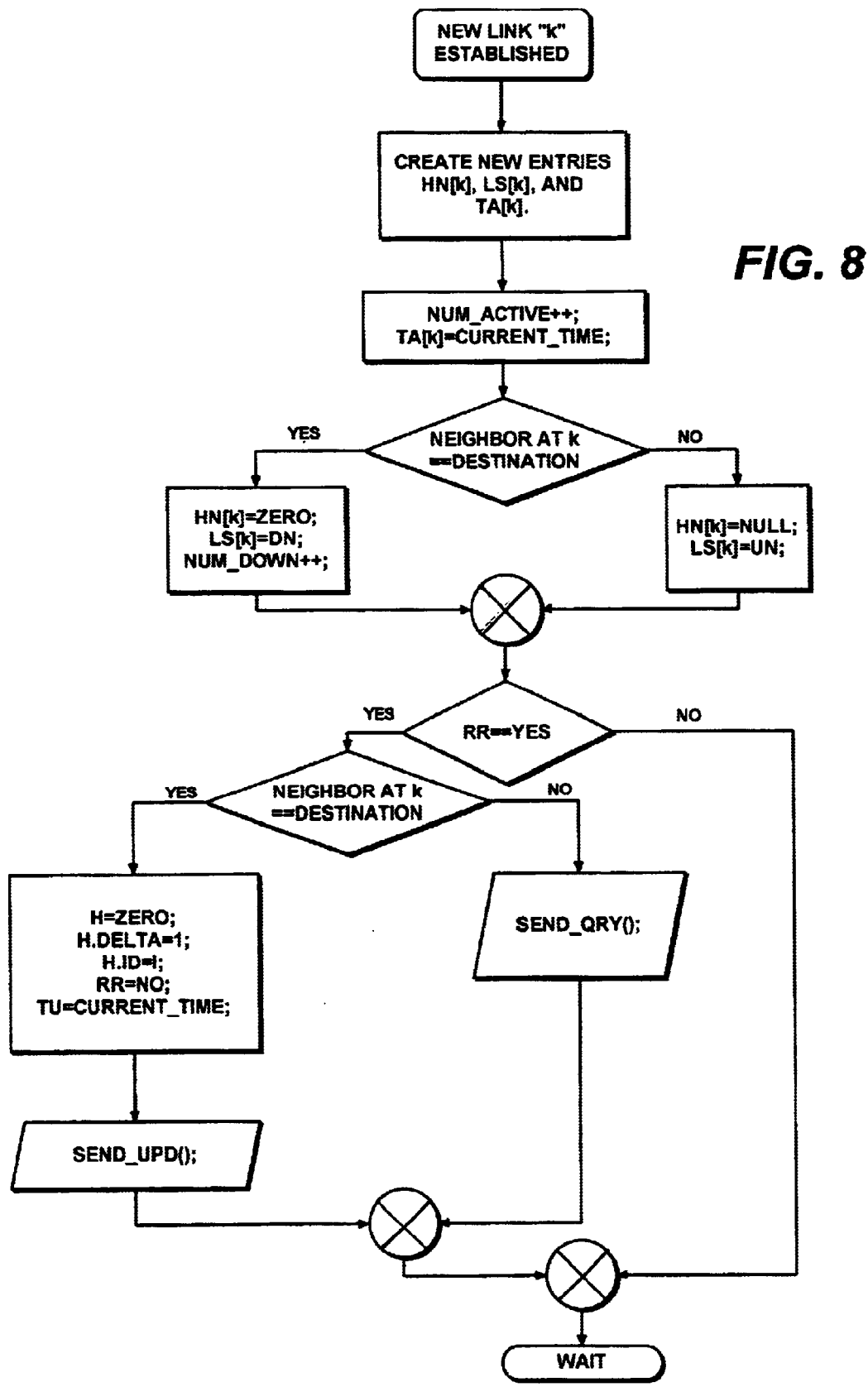

The following examples illustrate the maintaining routes process. FIGS. 4(a) and 4(b) provide an example where no reaction is required. The network is first depicted as at the end of FIGS. 2(a)–2(f)i, with the addition that link (D, E) is marked as failing. Since all nodes still have downstream links following the failure, no transmissions are required. This is likely to be of greater significance in more densely connected networks. FIGS. 5(a)–5(e) provide an example where a reaction is required. The network is first depicted as in FIG. 4(b), with the addition that link (B, H) is marked as failing. The time of the failure, as depicted in the example, was arbitrarily selected to be "1."

Following detection of a partition (i.e.,case 4), node i sets its height and the height entry for each neighbor $j \in N_i$ to NULL, updates all the entries in its link-state array LS, and broadcasts a CLR packet. The CLR packet consists of a did and the reflected reference level of node i, $(\tau_i, oid_i, 1)$. When a node i receives a CLR packet from a neighbor j∈$N_i$, it reacts as follows:

(a) If the reference level in the CLR packet matches the reference level of node i, it sets its height and the height entry for each neighbor j∈$N_i$ to NULL (unless the destination is a neighbor, in which case the corresponding height entry is set to ZERO), updates all the entries in its link-state array LS, and broadcasts a CLR packet.

(b) If the reference level in the CLR packet does not match the reference level of node i, it sets the height entry for each neighbor j∈$N_i$ (with the same reference level as the CLR packet) to NULL, and updates the corresponding link-state array entries.

Thus, the height of each node in the portion of the network which was partitioned is set to NULL and all invalid routes are erased. If condition (b) causes node i to lose its last downstream link, it reacts as in case 1 of maintaining routes. FIGS. 6(a)–6(h) provides an example that demonstrates partition detection and erasing of invalid routes. The network is first depicted as at the end of FIGS. 5(a)–5(e), with the addition that link (A, C) is marked as failing. The time of the failure, as depicted in the example, was arbitrarily selected to be "2".

It is possible to define the CLR packet with an additional one-bit field, which shall be referred to as a query flag. When a node would normally broadcast a CLR packet immediately followed by a QRY packet, the node broadcasts a CLR packet with the query flag set. Consequently, reception of a CLR packet with the query flag set is processed as if a CLR packet was received first and then a QRY packet was received.

Loop freedom and convergence within a finite time are generally desirable properties for routing protocols since protocols possessing them tend to perform well. These are generally desirable, but not necessary, conditions for good protocol performance. While the key concept of TORA is the maintaining routes function, a function which is simply a new algorithm in the same general class of known algorithms (and thus inherits the properties of that class), the entire protocol includes other mechanisms which place it outside this class of algorithms. For example, TORA adds the notion of a NULL height, a method for assigning non-NULL heights to previously NULL nodes (creating routes), the ability to detect network partitions, and a method for assigning NULL heights to previously non-NULL nodes (erasing routes). It is therefore necessary to re-address the properties of loop-freedom and convergence. In addition to the earlier stated assumptions regarding packet transmission and reception, it is also assumed that events (e.g., topological changes or packet receptions) are processed by each node in the order in which they occur and that each individual event is processed within a finite time.

Consider any time when the control packets that were created by nodes that modified their heights have been correctly received by all of the neighboring nodes, and any such neighboring nodes have updated their corresponding height and link-state entries. At any such time, no two neighboring nodes can disagree on the direction (i.e., UP versus DN) assigned to a given link (although one neighbor may consider the link assigned, while the other neighbor considers the link unassigned). This does not imply that all reactions have ceased. There may be any number of nodes that must subsequently modify their heights in accordance with the rules of the protocol (due to a link failure or a received control packet) and broadcast additional control packets.

Property: Loop-freedom. The routes defined by the link-state arrays are loop-free at every such instant in time.

Proof: Loop-freedom. This property is almost a direct result of the total ordering of the heights associated with the nodes, and the fact that these heights determine the direction of the links between nodes. The proof is by contradiction. Assume that a loop is formed (node 1 is considered downstream by node 2; node 2 is considered downstream by node 3; . . . ; node (k−1) is considered downstream by node k; and node k is considered downstream by node 1). A node i considers a neighbor j to be downstream based on comparison of its stored values for the respective heights, $H_i$ and $HN_{ij}$. This is not possible if any of the corresponding entries in the height arrays ($HN_{ij}$I(i, j) is part of the loop) are NULL, since a neighbor with a height of NULL is never considered downstream. A non-NULL height array entry for a neighbor j, implies prior reception of an UPD packet from that neighbor, which by the initial assumptions implies $HN_{ij}=H_j$ for all i=1 to k and j∈$N_i$I(i, j) is part of the loop. Furthermore, the height of all nodes that are part of loop must be non-NULL. Therefore, the internal node comparisons which define the downstream links, $HN_{2,1}<H_2$, $HN_{3,2}<H_3$, . . . $HN_{k,k-1}<H_k$, $HN_{1,k}<H_1$, can be rewritten $H_1<H_2<H_3$ . . . $<H_{k-1}<H_k<H_1$. This is a clear contradiction, since the heights are quintuples where the last value is the unique ID of the node (ensuring that they can be totally ordered lexicographically).

It would be comforting to show analytically that there is a finite bound on TORA's worst-case convergence time. However, this is not always true for the current specification of the protocol, i.e., in some circumstances the protocol can enter a cycle, or potential oscillation which theoretically could repeat indefinitely. The protocol is kept in this cycle, not by continuously occurring topological changes but by continuously occurring QRY packets being generated and transmitted by nodes at inopportune times, essentially building "invalid" routes rooted at nodes other than the destination.

In the absence of building new routes, the protocol (as specified) will converge within a finite time. Furthermore, that the creating routes process can be modified such that a finite bound on the worst-case convergence time can be established even in the presence of route building. However, it is not clear that doing so is desirable. Every mechanism that has been devised to accomplish this task would negatively impact the protocol's communication complexity so much as to make the "cure worse than the disease." Furthermore, the potential oscillatory behavior is highly dependent on the physical topology of the network, the state of the nodes at the time of the last topological change and the timing of the packet transmissions. Thus, it is unlikely that any oscillations will persist long. In essence, TORA is biased towards convergence. For the protocol to remain in the cycle requires an infinite sequence of near-perfectly timed QRY generations (something which would be highly unlikely). Any deviation from such a sequence would result in protocol convergence. Conceptually, this can be viewed as requiring omniscient active control to prevent protocol convergence-implying that TORA is inherently stable.

The results of a simulation study show that despite its unbounded worst-case convergence time, the invention performs well under a wide variety of networking environments, and never displays the traditional explosion of control or data message traffic that hallmarks protocol instability when routing tables become scrambled. Through approximately 150 hours of simulated runtime under rather extreme and stressing scenarios, TORA's average performance remains consistently good (i.e., comparable or better than an ideal link-state (ILS) algorithm). The amount of control overhead generated by TORA is less than that of ILS for every data point of every bandwidth utilization plot ever run.

One explanation for why the invention performs well, despite its unbounded worst-case convergence time, relates to the notion of inter-nodal coordination, a technique used in distance-vector routing algorithms to prevent the "counting-to-infinity" problem. In a distance-vector routing algorithm, nodes maintain (and exchange) estimates of their distance to the given destination. In a sense, this distance metric serves as a protocol's il anchor" to the destination and ensures global "stability." The counting-to-infinity problem can occur when nodes update their distance metrics based on a node with outdated information. With this conceptual view, it is apparent that the counting-to-infinity problem exhibited by some distance-vectoralgorithms is related to the unstable behaviors exhibited by the invention. By coordinating topological change reactions with surrounding nodes under certain circumstances, the counting to infinity problem can be prevented in distance-vector routing.

Although the technique is vastly different, TORA also uses a form of inter-nodal coordination. Upon failure of the last downstream link, a node generates a new reference level. The set of affected nodes propagate the reference level, essentially coordinating a structured reaction to the failure. In a sense, the set of nodes that propagate the reference level becomes "anchored" to the node that generated the reference level. Within an "unstable" section of the network (i.e., one where there are ongoing failure reactions anchored to different nodes), the coordinated group of nodes anchored to the node that generated the highest reference level will typically dominate (i.e., expand to include more nodes) until either all groups merge with it (and it joins a "stable" section of the network) or it detects a partition. If a partition is detected, all the nodes with that reference level will be set to NULL. Thus, this coordination of nodes with a common reference level has a stabilizing effect within the protocol, significantly reducing the likelihood of an excessively long convergence time.

As mentioned earlier, the "potential" for oscillatory behavior stems from the fact that routes are built on-demand, and that the height metric used in TORA is not firmly anchored to the destination. Thus, there is a potential for oscillations to occur when multiple sets of coordinating nodes are simultaneously detecting partitions, erasing routes, and building new routes based on each other. However, permitting this potential, something which would be forbidden in a traditional approach to protocol design, and then biasing the invention away from oscillation is exactly what allows localization of TORA's communication, making it highly-adaptive and well-suited for a dynamic bandwidth-constrained networking environment.

Since the protocol is designed to decouple (to the greatest extent possible) the generation of far-reaching control message propagation from the dynamics of the network topology, there is no explicit distance estimate or link-state information propagation. However, when the DAG is initially formed upon route creation (i.e., before any subsequent link reversals), the fourth element of each node's height $\delta_i$ essentially contains the distance in hops from the destination over the path traveled by the UPD packet to the node, recall FIG. 3(f). This distance information can be used, if desired, to favor routing over links with shorter distances; although, under heavy traffic conditions, this may not be appropriate due to the congestion-enhancing effect of single-path routing. As links are reversed in reaction to a failure, this distance information is lost in these "reversed"—network portions (as $\delta_i$ no longer denotes distance to the destination when the reference level is not zero). Thus, overtime, as the link reversal process proceeds, the destination oriented DAG may become less optimally directed than it was upon creation.

A possible enhancement to the protocol would be to periodically propagate optimization packets outwards from the destination, reception of which resets the reference level of all nodes to zero and restores distance significance to their $\delta_i$'s. In addition to serving as a routing enhancement, the optimization process guarantees that router state errors, resulting from undetectable errors in packet transmissions or other sources, do not persist for arbitrary lengths of time. Any router state which is not explicitly refreshed by the optimization process will eventually time-out and be deleted (i.e., returned to a NULL value), Thus, the periodic optimization also serves as softstate confirmation of route validity. This optimization/refresh process permits introduction of far-reaching control message propagation as a secondary, background mechanism that is independent of network topology dynamics. Although the overhead associated with this optimization mechanism grows proportionally to the square of the number of nodes, the periodic interval is controllable. Ideally, this procedure should occur at a very low rate, to minimize the impact of the added overhead.

A simulation study was conducted to evaluate the relative performance of TORA and ELS routing. The simulations were designed to provide insight into the effect of varying network size, average rate of topological changes and average network connectivity. While the average network connectivity was found not to be a significant factor, the relative performance of TORA and ILS was found to be critically dependent on the network size and average rate of topological changes. The results indicate that for a given available bandwidth, as either the size of network increases or the rate of network topological change increases, the performance of TORA eventually exceeds that of LS. Specifically, as the network size and/or rate of topological change increases, the amount of control overhead for ILS increases much more rapidly than for TORA, effectively congesting the communication channel and causing additional queuing delay for message traffic. Therefore, above some combination threshold of network size and rate of topological change, TORA provides lower end-to-end message packet delay on average for a given available bandwidth.

The point to be emphasized is that under some networking conditions TORA, which is not a shortest-path routing algorithm, can out perform a shortest-path routing algorithm. ILS is but one approach for performing shortest-path routing. Nevertheless, for a given network size and rate of topological change, any shortest-path algorithm requires a minimum amount of control overhead to permit continuous computation of the shortest-path. We conjecture that as the network size and/or rate of topological change are increased, this minimum amount of control overhead to permit computation of the shortest-path will increase more rapidly than the amount of control overhead for TORA.

For example, the flow charts of FIGS. 7–16 illustrate one example of a specification of an algorithm implementing the method of the present invention. Specific variables of these flow charts are defined in Table 1. This example can also be used to implement a system according to the invention.

The above description of a temporally ordered routed algorithm requires the use of synchronized clocks in order to maintain loop free routes to the destination. This TORA embodiment works well when all the nodes participating in the computation have synchronized clocks. If the nodes do not have synchronized clocks, or if the synchronization of one or more clocks has an error, then the distributed computation method described in the previous embodiment can result in the formation of invalid routes to the destination under certain conditions.

As discussed above, the routing method described herein is for a set of nodes N and a set of links L. Each node also maintains the state of a route required flag, which registers whether a route to a given destination has been requested.

Each node i maintains its own height, $H_i$, which can be represented by $H_i=(\tau_i, oid_i, r_i, \delta_i, i)$, where the first three values $\tau_i$, $oid_i$, and $r_i$ can be thought of as a reference level and the last two values $\delta_i$ and i can be thought of as a delta from the reference level. The first value, $\tau_i$, is a time tag associated with the time the reference level was created, e.g. the time of a link failure, as discussed in an earlier section. Note that the terminology H.tau is used to refer to the first value in the height maintained by a node i ($\tau_i$ in $H_i$). The second value, $oid_i$, is the unique node ID of the node that created the reference. The third value, $r_i$, identifies whether it is a reflected reference level. The fourth value, $\delta_i$, is an integer which is used to order the nodes with respect to a common reference level. The fifth value, i, identifies the node, and ensures a total ordering of all nodes.

Each node i also maintains a height array $HN_{ij}$ for each neighboring node j. The terminology HN[n].tau is used to refer to the first value in the height of a neighboring node n maintained by a node i ($\tau_n$ in $HN_{i,n}$).

Each node also has the capability of determining the direction of links incident on the node. In the embodiment described herein, each node maintains a link state LS(i,j) for each incident link, which may be in states UP (upstream), DN (downstream), or UN (unassigned). The direction of the link is based on the heights of the nodes which comprise the link. If a link $(i, j) \in L$ is directed from node i to node j, node i is said to be "upstream" from node j while node j is said to be "downstream" from node i. The link state for each incident link could be determined on an as-needed basis or could be maintained continuously.

As discussed above, $\tau_i$, the first value in the reference level of a height, is a time tag set to the "time" of the link failure. Whenever a node i must select a new reference level in response to losing its last downstream link, it selects a $\tau_i$ based on the time of the link failure, as perceived by the node i. If the clocks are synchronized, the newly selected height will be higher than all previously defined heights of neighboring nodes, and selection of the new height for node i will reverse the direction of all links incident on that node. In the previous embodiment of the TORA invention, described above and in U.S. patent application Ser. No. 09/266,868, it was assumed that all clocks were sufficiently synchronized to correctly establish the temporal order of link failures in the network.

If the clocks are not synchronized, a node i may sometimes select a new height which is lower than the heights of some or all of the neighboring nodes. If the newly selected height of node i is lower than the heights of all of the neighboring nodes, then none of the links incident to node i would be reversed, and node i would not have a downstream link for forwarding traffic to the destination.

For proper operation in the absence of synchronized clocks, it is necessary to ensure that, when a node i with no downstream links selects a value for $\tau_i$ based on the locally perceived time of the link failure, the direction of at least one of the links incident to node i will be reversed.

The general situations in which it is necessary to ensure that the newly selected height will reverse the direction of at least one of its incident links are shown in FIG. 3, Cases 1 and 5, in which a new reference level is generated in response to the failure of the node's last downstream link. In both Case 1 and Case 5, when the reference level is set as $(\tau_i, oid_i, r_i)=(t, i, 0)$, where t is the time of the link failure, the new reference level may not be adequate to ensure the reversal of the links if the clocks are not synchronized.

Figure 9:
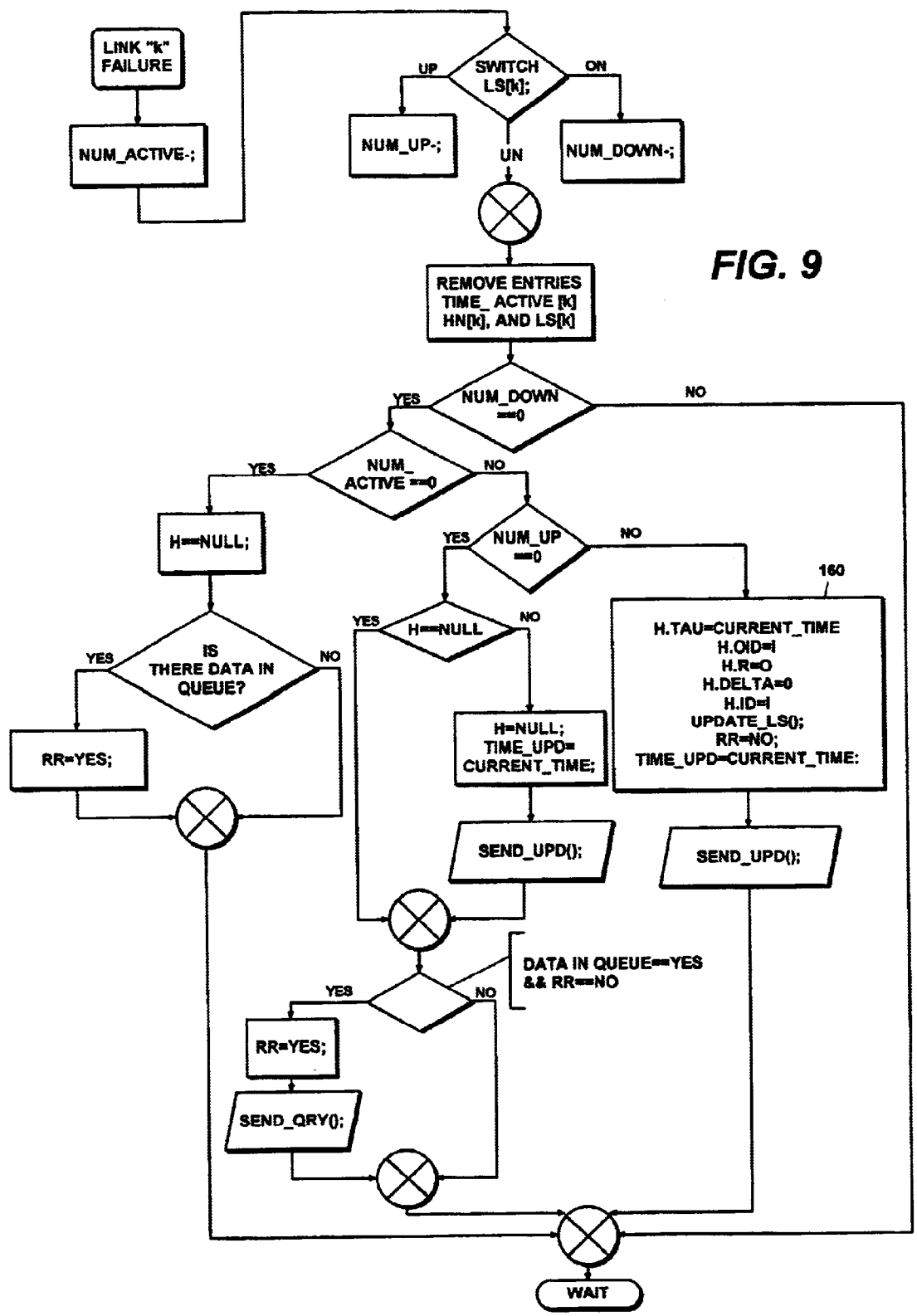
Figure 10:
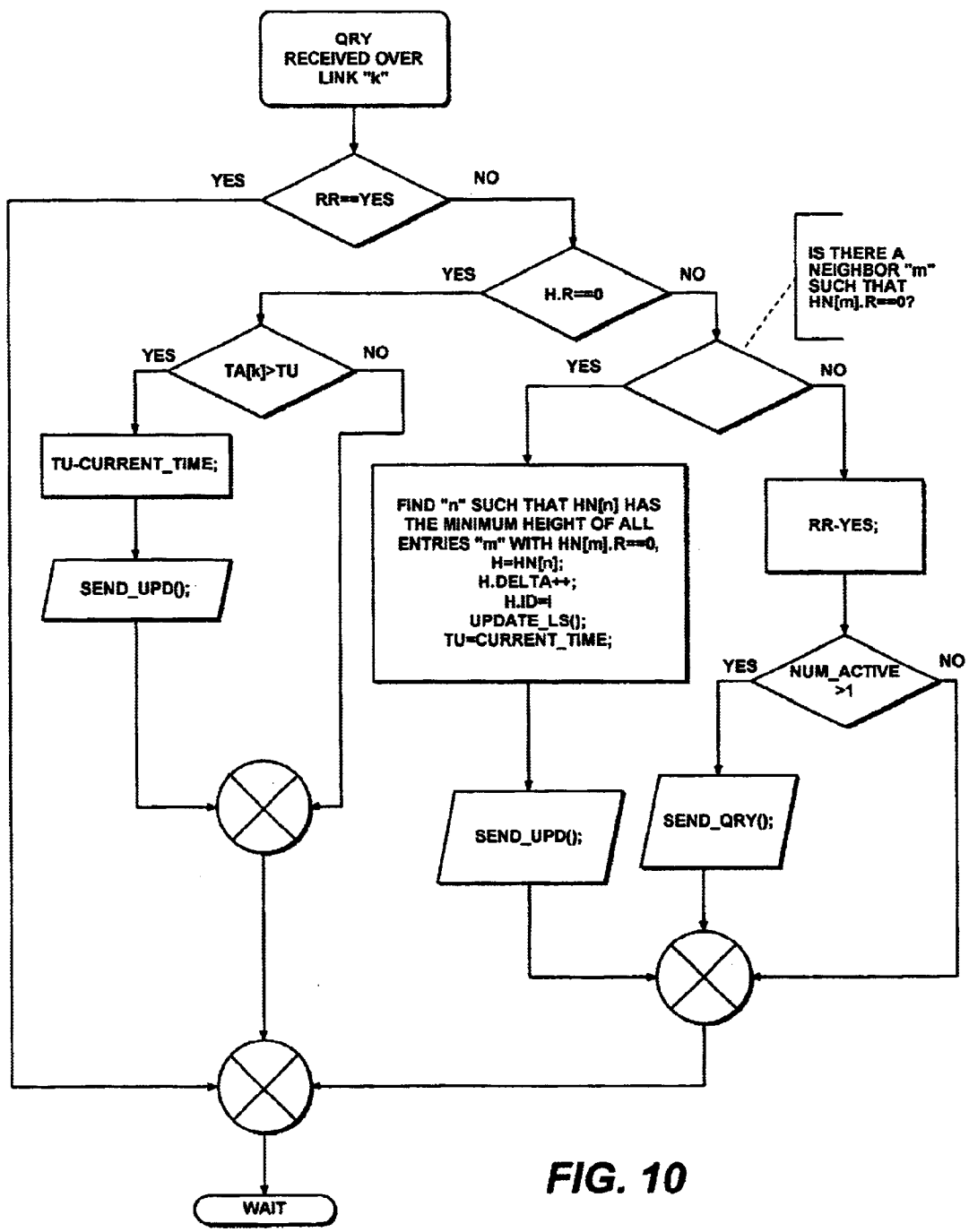
Figure 11:
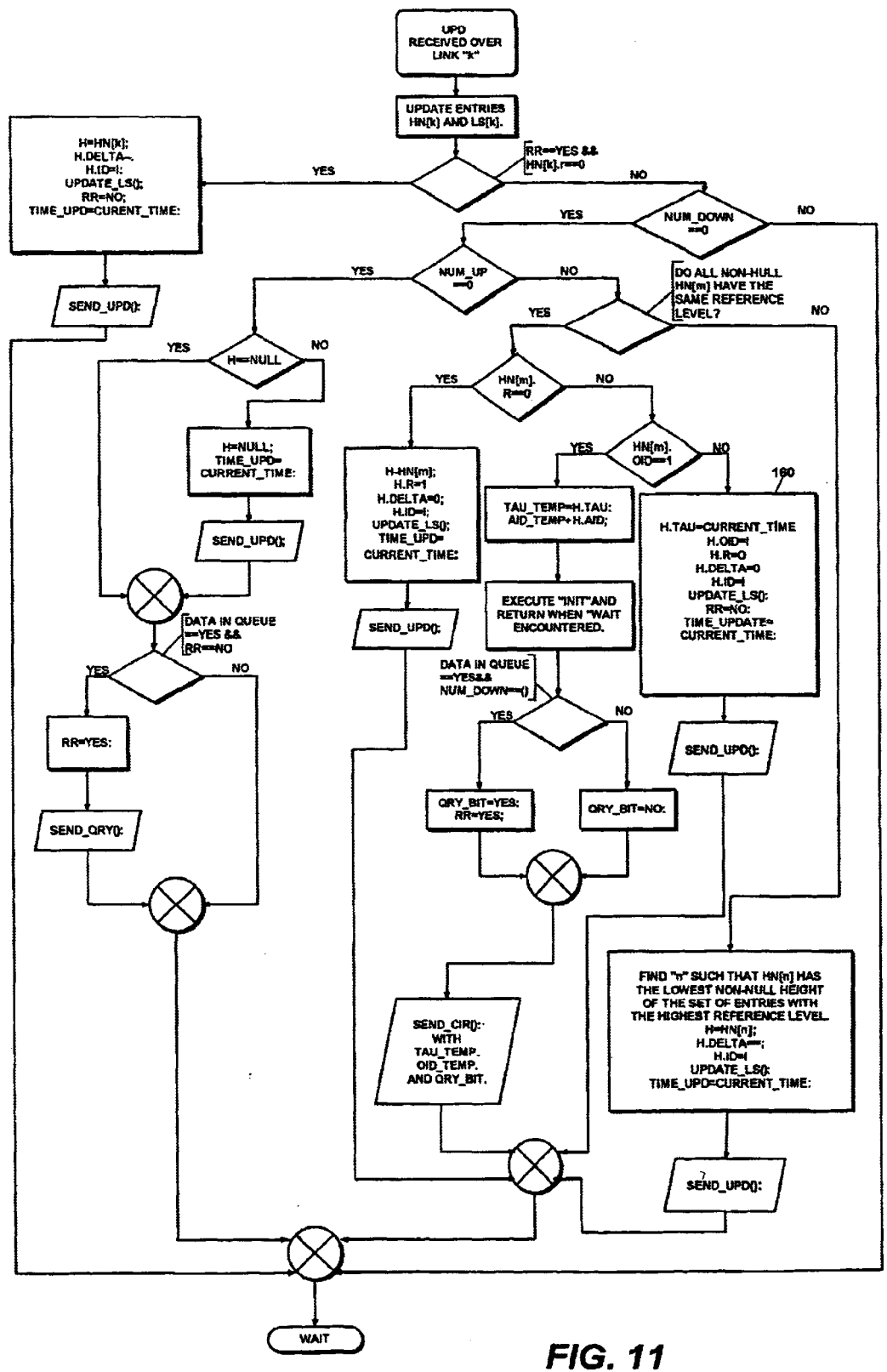
Figure 14:
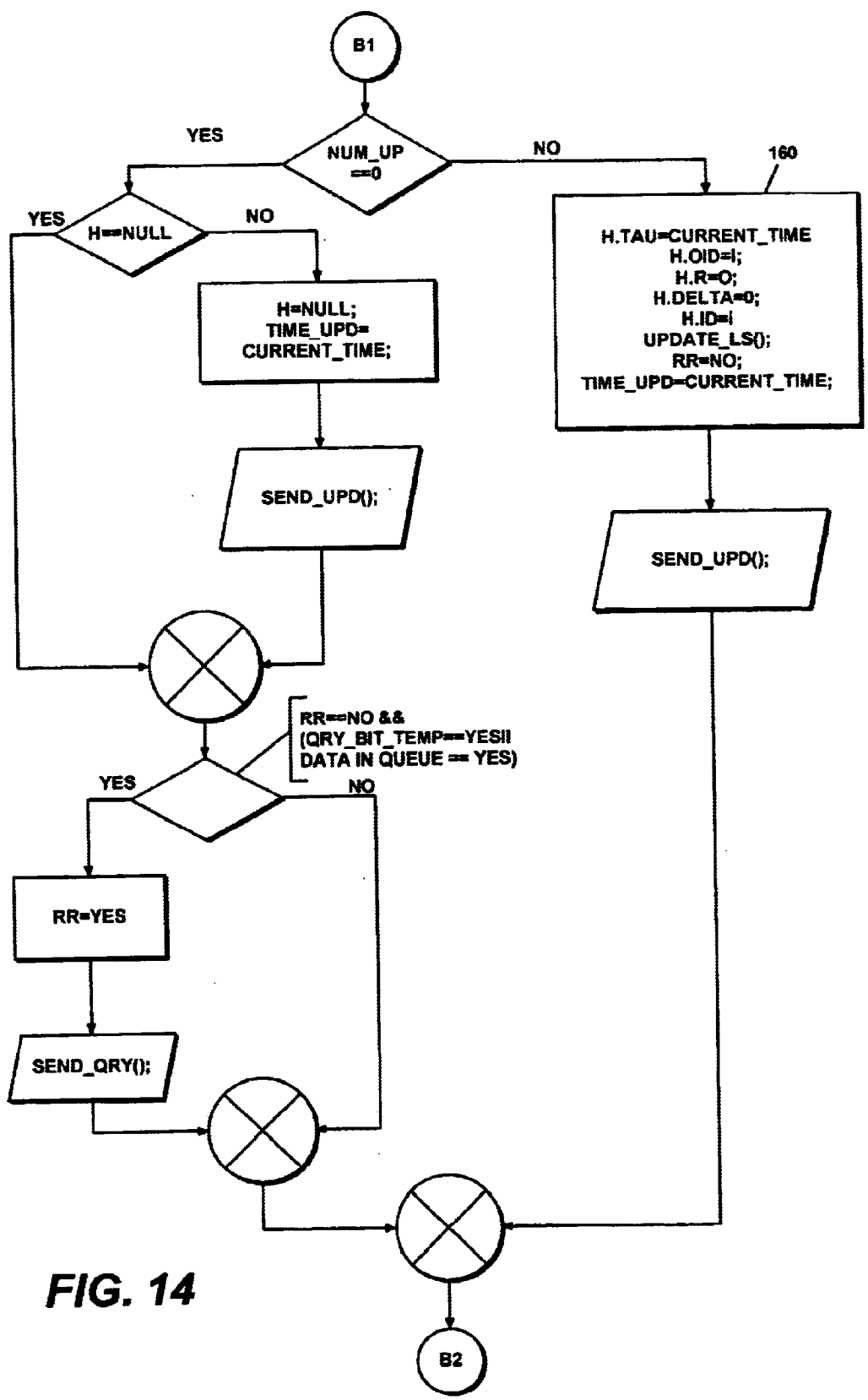
Figure 15:
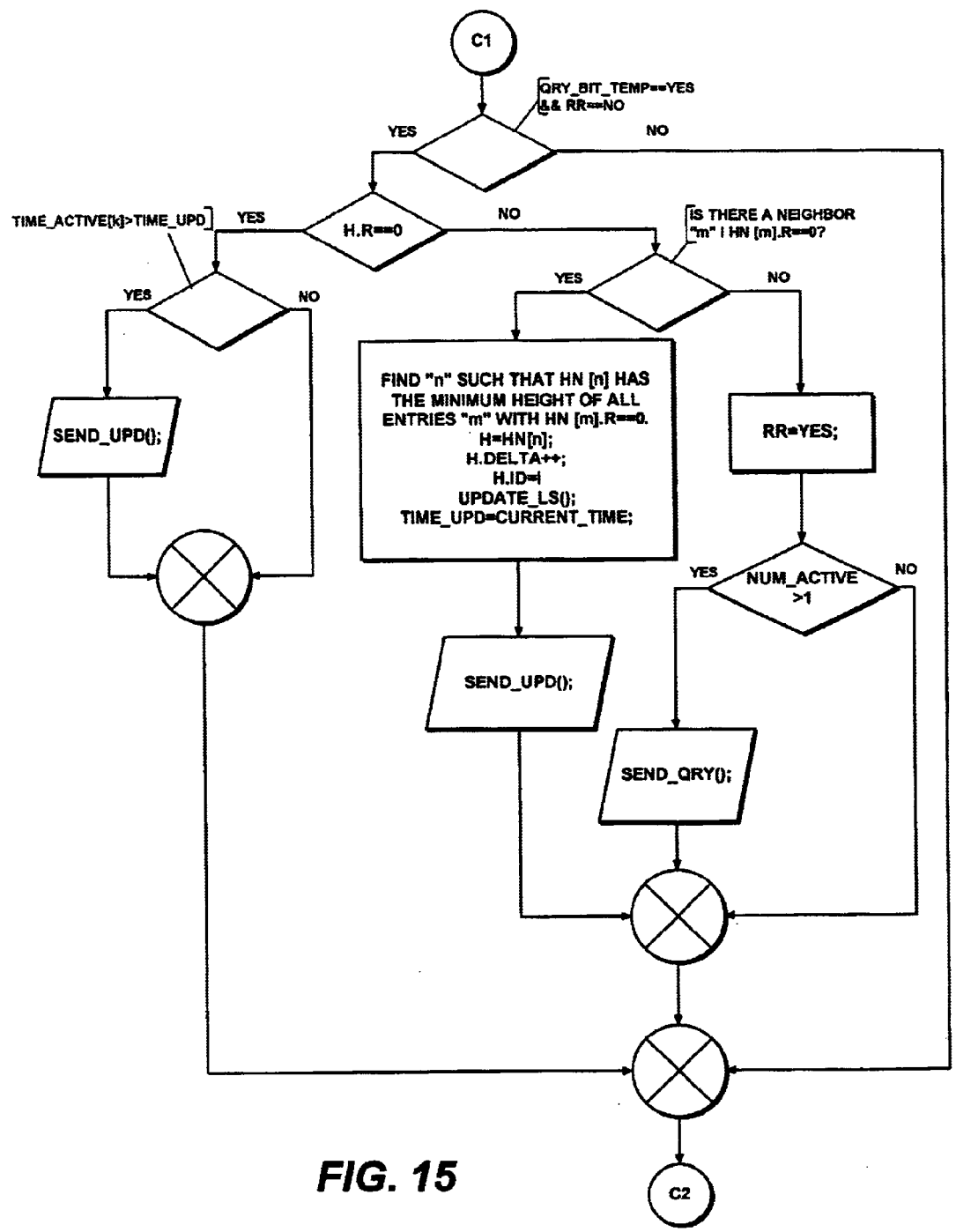
Figure 16:
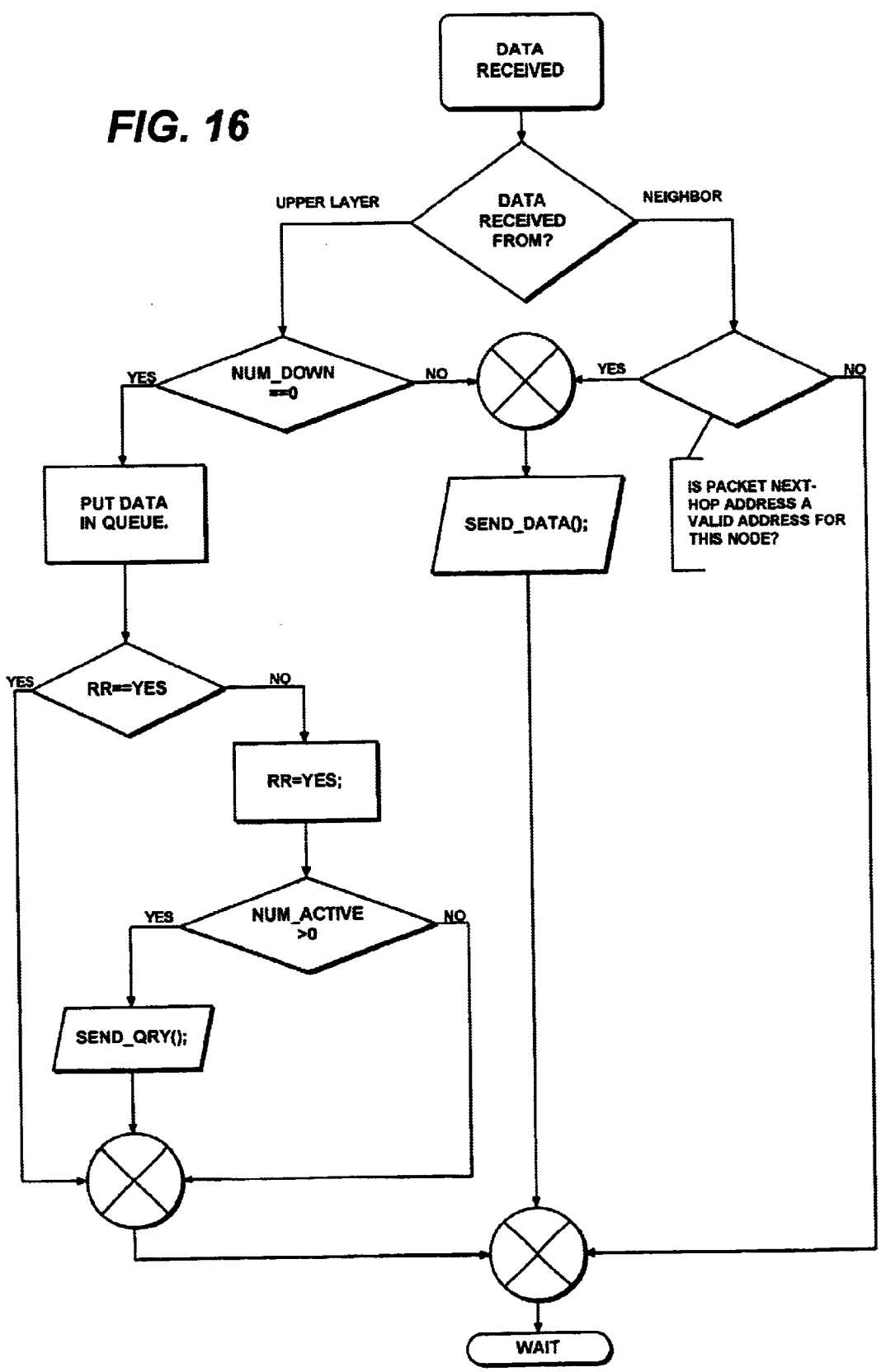

A step in which node i updates its reference level in response to the loss of its last downstream link is found in FIGS. 9 (step 160) FIG. 11 (step 160) and FIG. 14 (step 160). In each of these three cases, if the clocks are not synchronized, the height of the node may not be sufficiently increased to ensure link reversal.

Figure 17A:
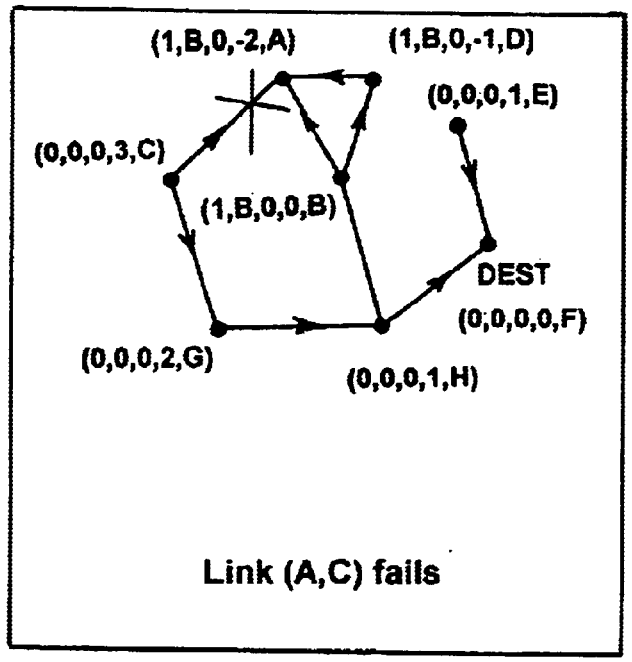
FIGS. 17(a)–17(b) illustrate an example of maintaining routes, in the absence of synchronized clocks, following a link failure which does require a reaction, which results in invalid routing states.
Figure 17B:
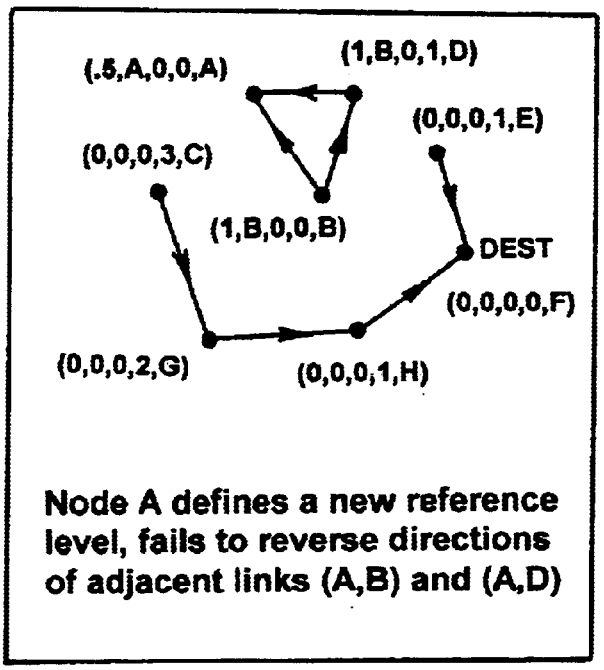

An example of the problem resulting from unsynchronized clocks is shown by reference to FIG. 17. FIG. 17a corresponds to the situation shown in FIG. 6a, with the additional information that the link between node A and node C has failed, leaving node A with no downstream links. According to the decision tree in FIG. 3 (case 1), node A must generate a new reference level. If A's clock is in synchronization with the other nodes, node A will select a new value for $\tau_i$ based on the time of the link failure, and the new value for $\tau_i$ will be greater than the $\tau$ value for the neighboring nodes. If, however, node A's clock is out of synchronization with the other nodes, node A might select a new reference level value which is lower than the reference level of the neighboring nodes. An example is shown in FIG. 17b, in which node A selects its new height as (0.5, A, 0, 0, A). Since the reference level for node A is not greater than the reference levels for neighboring nodes D and B, no link reversal will occur. Without synchronization of the clocks between A, B, and D, there is no guarantee that the node A will select a new reference level sufficient to reverse the direction of an incident link.

Figure 18:
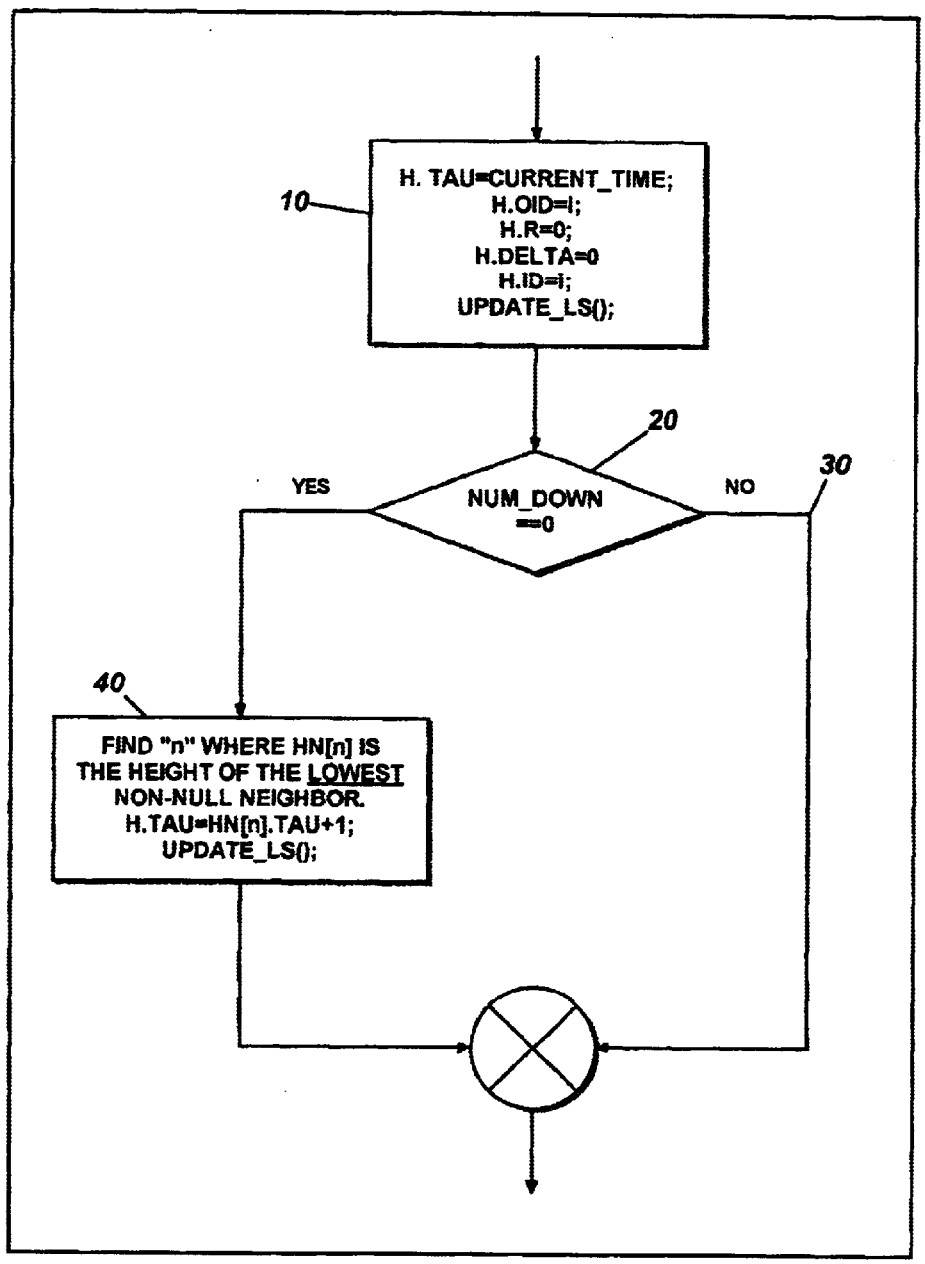
FIG. 18 is a flow chart illustrating an example of a generating a new reference level in the absence of synchronized clocks.

In order to avoid the problem illustrated in FIG. 17b, the original temporally ordered routing algorithm can be modified to ensure that the direction of at least one incident link is reversed. FIG. 18 shows an example of one way to accomplish the link reversal. Recalling that the symbol H.tau refers to the first height value tr for a node i, in FIG. 18, step 10, H.tau is set to the current locally perceived time. Next, in step 20, it is determined whether there is at least one downstream link incident on the node i. If there are downstream links, 30, then no further modification of the reference level is required. If there are no downstream links, in step 40, H.tau is modified in a manner that ensures the reversal of at least one downstream link. In order to ensure reversal of at least one link, H.tau must be set to be greater than the height of the lowest neighboring node, ensuring that the direction of at least the link between the node i and the node with the lowest height would be reversed. The example in FIG. 18 illustrates resetting H.tau to be H.tau=HN[n].tau+ 1, where HN[n] is the height of the lowest non-NULL neighboring node. Alternatively, H.tau may be set to be greater than the height of the highest non-NULL neighboring node, ensuring the directions of all links incident on node i would be reversed.

Another alternative method for selecting a reference level sufficient to ensure link reversal is as follows: H.tau may initially be set to the greater of the value of the current local time or the value of $\tau$ for a non-NULL neighbor plus an increment in step 10. For example, H.tau may be set as: H.tau=max{current_time, HN[n].tau+1}, where HN[n].tau may be defined as, for example, the height of the lowest non-NULL neighbor or the height of the highest non-NULL neighbor. This alternative eliminates the need for steps 20, 30, and 40 of FIG. 18, as H.tau is set to a sufficiently large value to ensure link reversal in one step.

In another alternative embodiment, the method for preventing formation of invalid route relies on maintenance of a local clock bias by each node. A local clock bias, b, is maintained and applied to the current local time such that when a node i with no downstream links selects a new height based on its adjusted local time (local current time plus the bias), guaranteeing the reversal of at least one link. For example, each time a node i learns of a new neighbor height, HN[n], it computes its local clock bias as b=max{b, HN[n].tau−current_time}, where HN[n].tau is the time tag associated with the new neighbor height and current_time is the current local time at node i (without an applied bias). Then when a node i selects a new height, it simply sets H.tau= current_time+b.

FIG. 18 also shows the use of a variable num_down to determine whether the number of downstream links incident on a node is zero, step 20. This variable is not necessary for operation of the routing algorithm described herein. Alternatives are readily apparent for determining the number of downstream links incident on a node.

Figure 19:
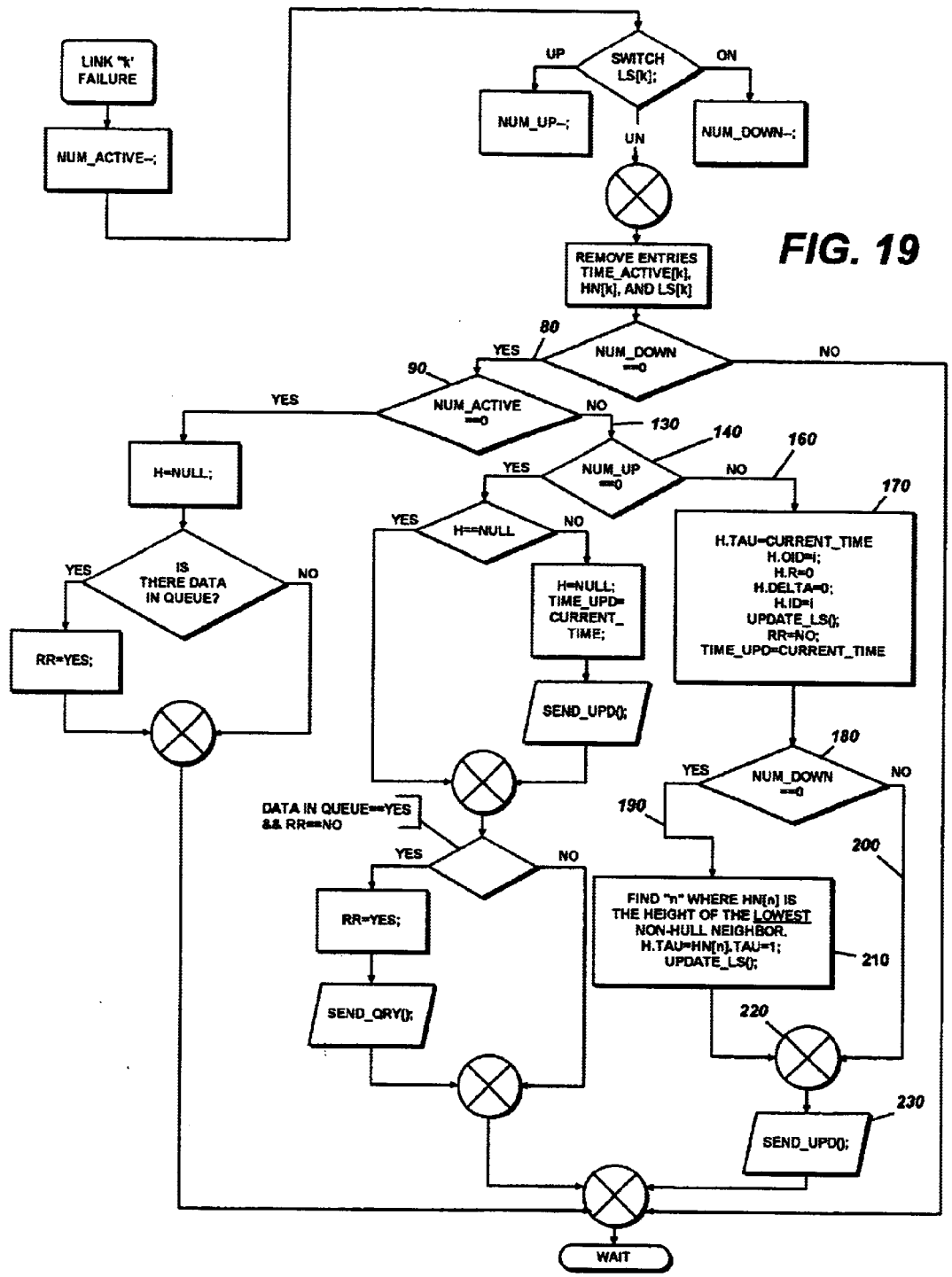
FIGS. 19–21 are flow charts that can be substituted for FIGS. 7, 11, and 14, to illustrate another embodiment of a protocol of a temporally ordered algorithm adapted for use in the absence of synchronized clocks.
Figure 20:
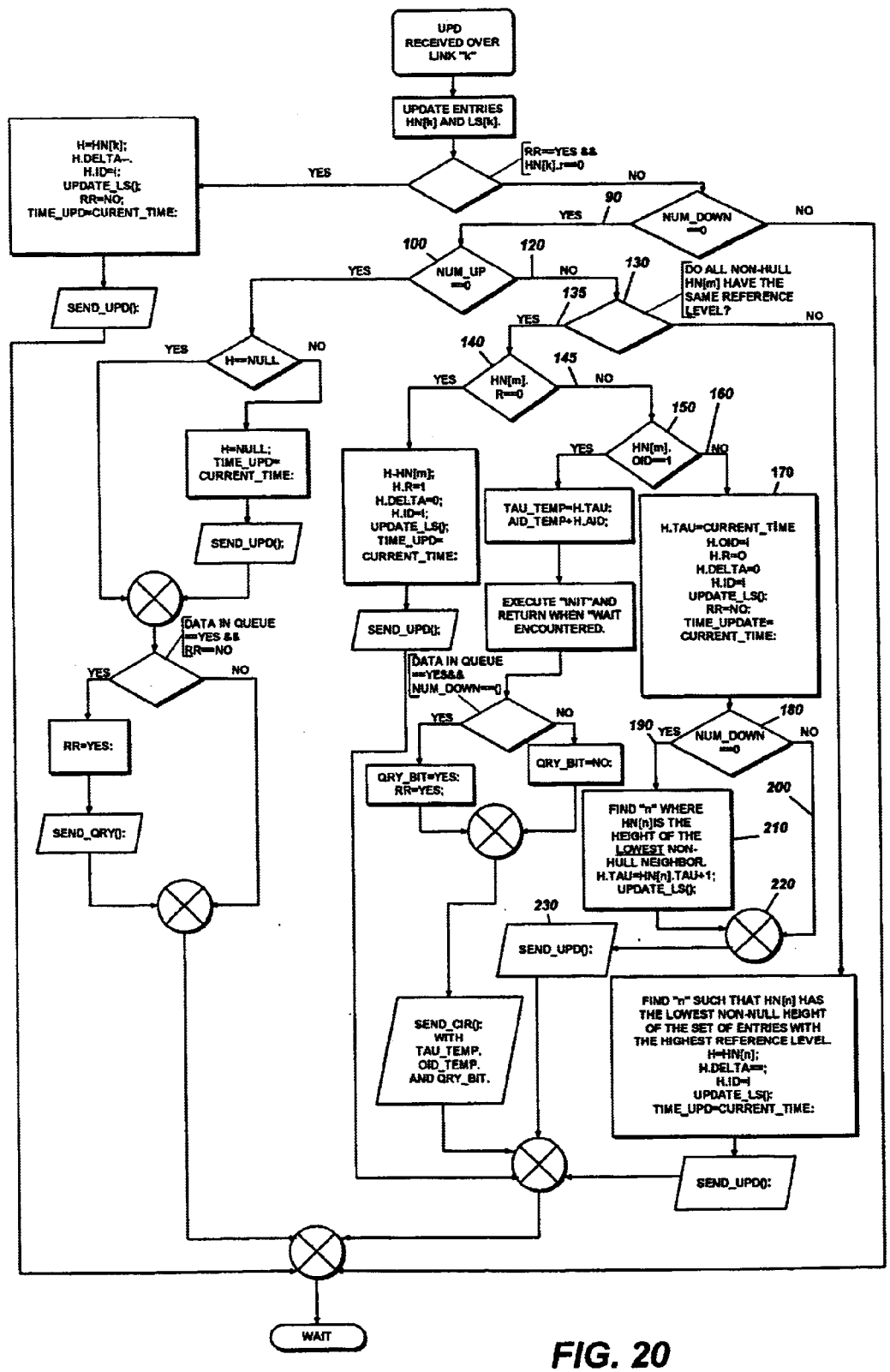
Figure 21:
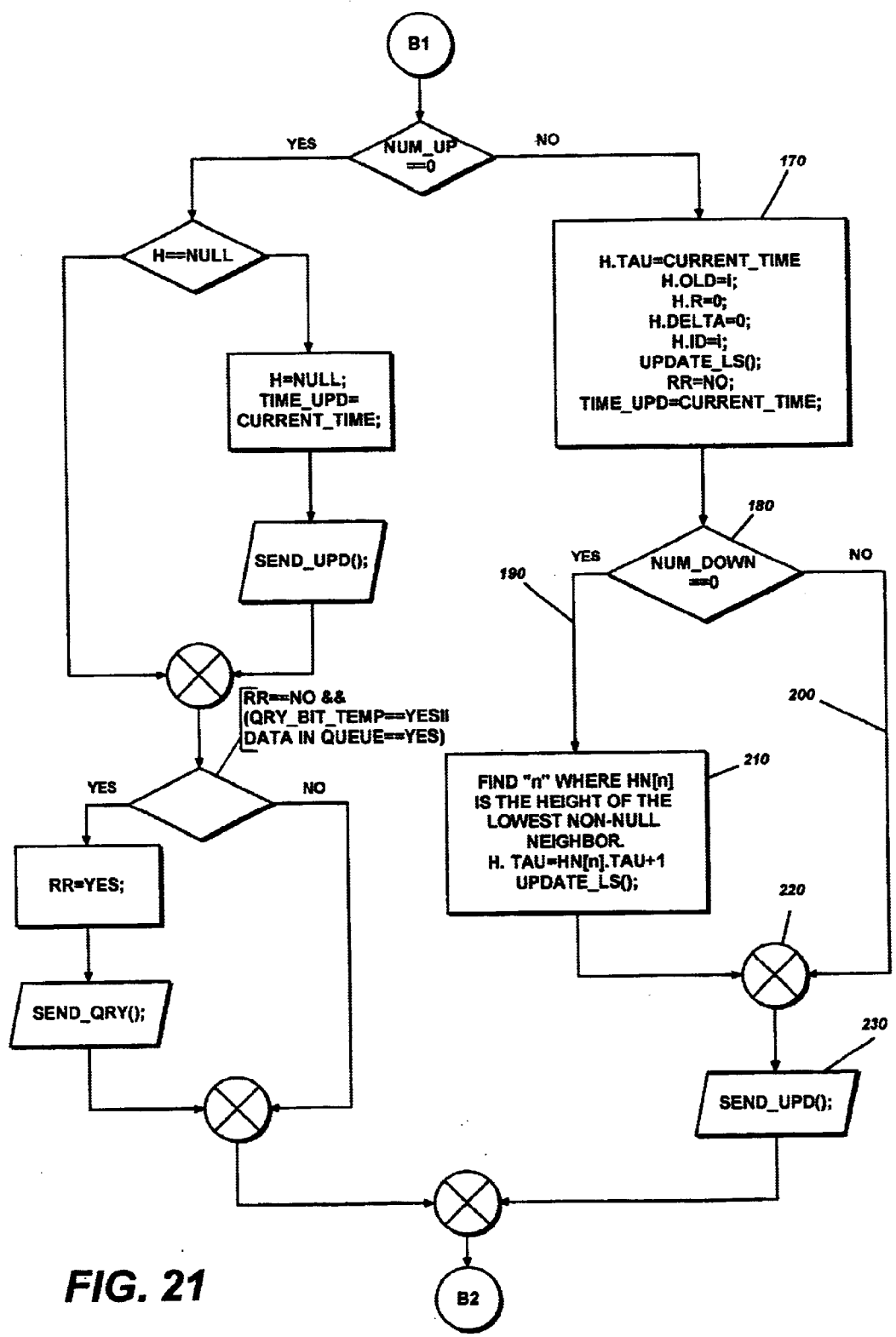

FIGS. 9, 11, and 14, which illustrate part of an embodiment of the previously described temporally ordered routing algorithm, all may be modified to ensures the reversal of at least one link whenever there are no downstream links and a node's reference level is reset. FIGS. 19, 20, and 21 are flowcharts which can replace FIGS. 9, 11, and 14 to show an example of new embodiment of the routing algorithm. The alternatives discussed in the preceding discussion of FIG. 18 above may also be used as steps to ensure link reversal in the routing algorithm. The steps shown in the flowcharts are illustrative of one possible embodiment for practicing the invention, although it will be clear that other alternatives are possible within the scope of the invention.

FIG. 19 illustrates one embodiment of the invention at a point at which a node i has has experienced the failure of an incident link k between node i and a neighboring node. If a node i has no downstream links, 80, and has upstream links, 160, then reversal of the direction of at least one incident link is needed in order to maintain a route to the destination or detect a partition. If there are active links incident on node i, 130, and at least one active links is an upstream link, 160, then the reference level of node i must be reset. Thus far, the embodiment is identical to the steps shown in the previously discussed embodiment of the invention as shown in FIG. 9. This may be further understood by reviewing FIGS. 5b and 5c, wherein the link between node B and node H fails, and node B has no downstream links. Since node B has active upstream links, (B,D) and (B,A), node B must reset its height to ensure reversal of at least one of these active upstream links.

When the reference level of node i is reset, however, it is important to ensure that the newly selected height is sufficient to ensure link reversal, particularly in the case of unsynchronized clocks. Steps 170, 180, 190, 200, 210, and 220 illustrate the use of the new procedure shown in FIG. 18 to ensure link reversal. Note that any of the alternative methods discussed above may also be used in place of steps 170–220, to select a new height for node i.

Following selection of a new reference level, an update packet is broadcast, 230, to inform neighboring nodes of the new height of node i, and the destination identification did.

FIG. 20, Steps 170, 180, 190, 200, 210, and 220, illustrate modification of the previously described TORA algorithm to incorporate the procedure shown in FIG. 18 to ensure link reversal when a new reference level is selected in response to receipt of an update packet. Note that any of the alternative methods discussed above for selecting a new reference level for node i may also be used in place of steps 170–220.

At step 170 in FIG. 20, a node has received an update packet over link k. An example is node D in FIG. 5b, which has received an update packet from node B. Referring again to FIG. 20, the node has no downstream links, 90, does have an upstream link, 120, and all non-NULL neighbors have the same reference level, 135. The neighbor's reflection bit is 1, 145, and the neighbor's second height value, oid, is not equal to i, 160, which indicates that node i was not the originator of the reference level. This corresponds to Case 5 of FIG. 3.

Figure 12:
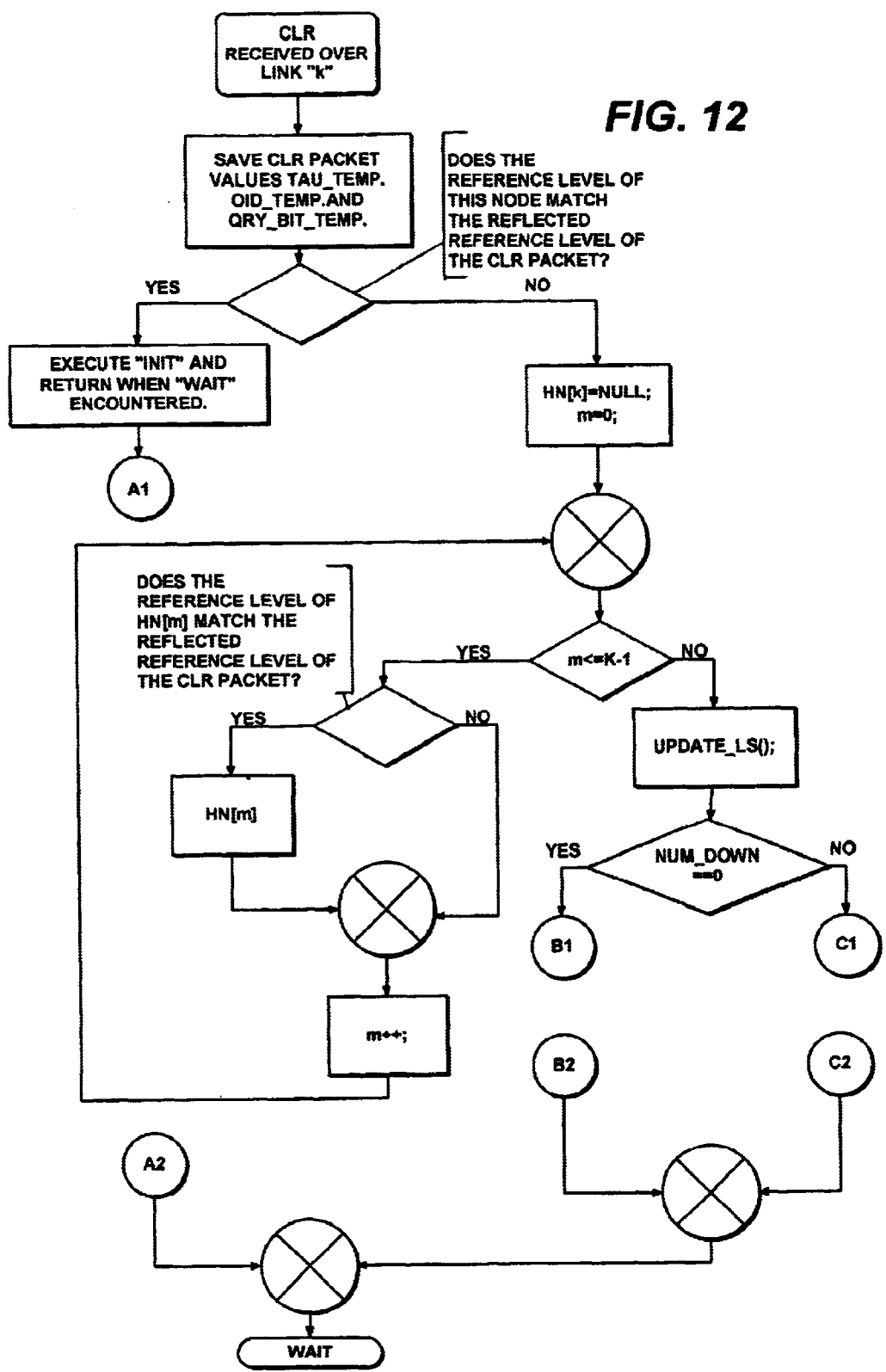
Figure 13:
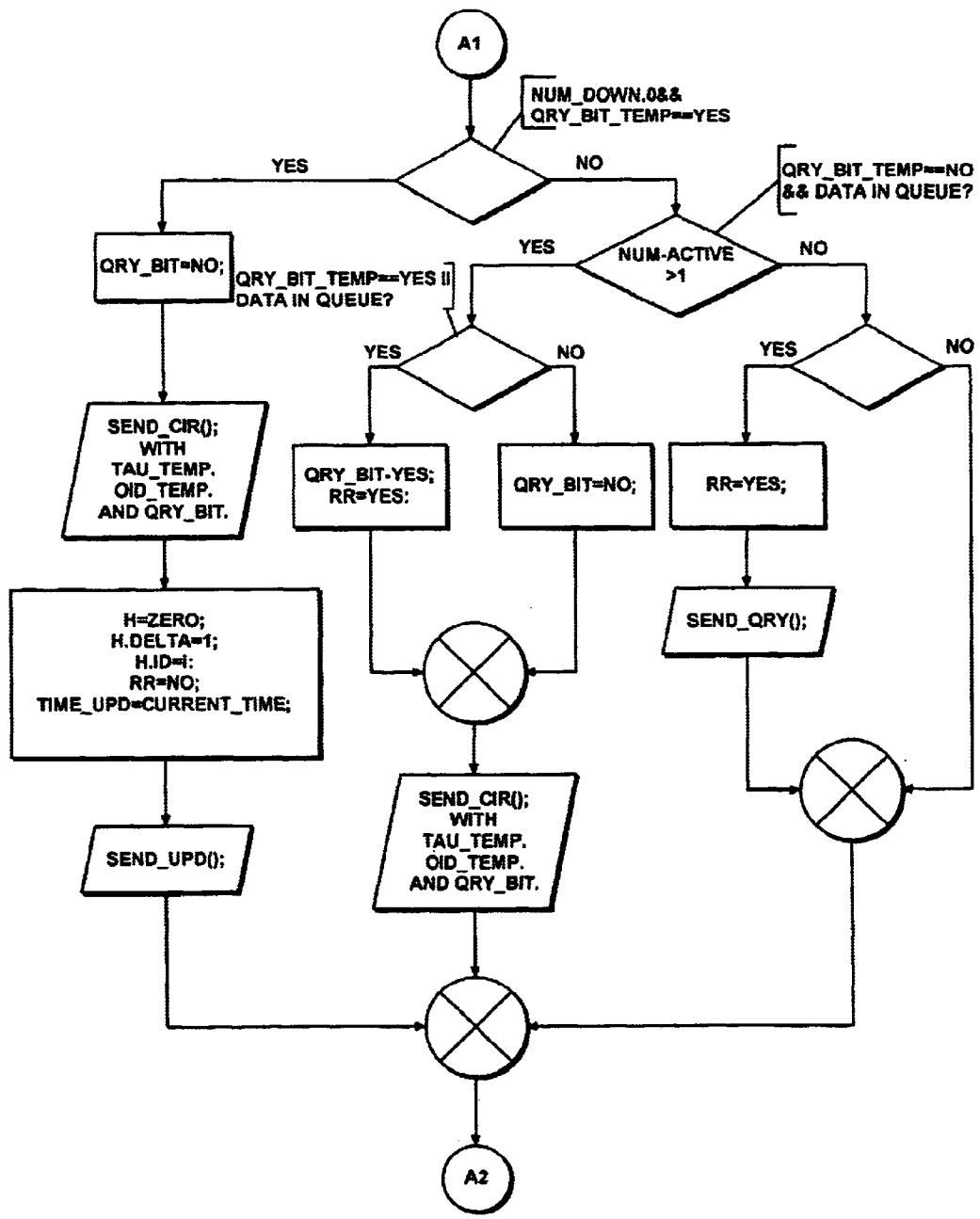

FIG. 21 is a continuation of FIG. 12, and illustrates the steps which follow receipt of an CLR packet by node i over link k, where link k is the link between node i and a neighboring node. As the algorithm proceeds through the process of erasing routes, if the reference level of the node i does not matches the reflected reference level of the CLR packet, and if node i has no downstream link, and if node i has an upstream link, then it is necessary to update the height of node i to ensure reversal of at least one link. Steps 170 through 220 in FIG. 21 illustrate modification of the previously described TORA algorithm to incorporate the procedure shown in FIG. 18 to ensure link reversal when needed. Note that any of the alternative methods discussed above may also be used to select a new reference level for node i in place of steps 170–220.

TABLE 1

| Data Structures | | |
|---|---|---|
| Height | | Data Structure used to store the quintuple referred to as the height of the node |
| .tau | double | the time the reference level was created |
| .oid | integer | the unique ID of the node that created the reference level |
| .r | boolean | Flag indicating if it is a reflected reference level (0, 1) |
| .delta | integer | Metric used in propagation of a reference level |
| .id | integer | The unique id of the node (guarantees total ordering) |
| Predefined Values | | |
| NULL | Height | An unknown or undefined height (Can be thought of as an infinite height.) |
| ZERO | Height | The assumed height of the destination. Height.tau = 0.0 Height.oid = 0 Height.r −= 0 Height.delta = 0 Height.id = the unique node of the destination |
| State Variables | | |
| H | Height | The height of this node. |
| RR | boolean | Flag incident if a route is required (NO, YES). |
| TU | double | The time at which an UPD packet was last sent by this node. |
| For each active link "k" maintain the following variables | | (I.e. where "k" is a logical link that supports full duplex communication connecting to an adjacent node. |
| HN[k] | Height | The height of the adjacenet connected via link "k". |

TABLE 1-continued

Data Structures

| | | |
|---|---|---|
| LS[k] | enumeration | The assigned state of link "k" (UN, UP, DN). |
| TA[k] | double | The time at which link "k" became active. |

Auxiliary variables

| | | |
|---|---|---|
| num_active | integer | The number of active adjacent links. |
| num_down | integer | The number of links marked DN in the LS array. |
| num_up | integer | The number of links marked UP in the LS array. |
| rr_temp | boolean | Temporary variable used to store value of RR (NO, YES) |
| tau_temp | integer | Temporary variable used to store value of Height.tau |
| oid_temp | integer | Temporary variable used to store value of Height.oid |

Functions:

| | | |
|---|---|---|
| update_LS( ) | | For each active link "k", update LS[k] in accordance with the following rules:<br>If HN[k] == NULL then LS[k] = UN;<br>else if H == NULL then LS[k] = DN;<br>else if HN[k] < H then LS[k] = DN;<br>else if HN[k] > H then LS[k] = UP;<br>In the above equations, heights are compared lexicographically. |
| send_qry( ) | | Broadcast a QRY packet to the set of adjacent nodes. |
| send_upd( ) | | Broadcast an UPD packet to the set of adjacent nodes. |
| send_clr( ) | | Broadcast a CLR packet to the set of adjacent nodes. |

The foregoing description of the present invention discusses and illustrates a method for routing in a dynamic bandwidth constrained network in the absence of synchronized clocks. A person of ordinary skill in the art would understand that this method could be applied to other types of networks, where routes must be created, maintained, and erased. The methods described herein are well suited for large, bandwidth-constrained networks such as mobile, multi-hop, wireless networks.

The above description of several embodiments of the invention is intended for illustrative purposes only. Numerous modifications can be made to the disclosed configuration, while still remaining within the scope of the invention. For a determination of the metes and bounds of the invention, reference should be made to the appended claims.

What is claimed is:

1. A routing method for a network, said routing method comprising:
providing a plurality of neighboring communication nodes including a first node and a second node,
each node having a height,
said first node having a height greater than that of said second node,
determining whether said second node has a downstream link, and
if said second node has no downstream link, selecting a new height for said second node sufficient to reverse the direction of at least one link between said second node and said neighboring nodes.

2. A routing method as in claim 1, wherein said selecting said new height for said second node comprises:
selecting said new height for said second node greater than the height of at least one neighboring node.

3. A routing method as in claim 2, wherein said selecting said new height for said second node comprises:
selecting said new height for said second node greater than the height of the highest non-NULL neighboring node.

4. A routing method as in claim 1, wherein said selecting said new height for said second node comprises:
selecting said new height for said second node greater than the height of the lowest non-NULL neighboring node.

5. A routing method as in claim 1, wherein each node has a current time, and
wherein said selecting said new height for said second node comprises: setting said new height for said second node equal to said current time at said second node,
determining whether said second node having said new height has any downstream links, and
if said second node has no downstream links,
increasing said new second height of said second node sufficiently to reverse the direction of at least one link between said second node and said neighboring nodes.

6. A routing method as in claim 1,
wherein each node has a current time and a local clock bias, and
wherein said selecting new height for said second node comprises:
adding said local clock bias of said second node to said current time at said second node.

7. A routing method as in claim 6, wherein upon said second node becoming aware of a neighbor having a new height,
said second node updates said local clock bias as the larger of (a) said local clock bias or (b) the height of said neighbor having said new height minus said current time at said second node.

8. A system for routing in a network, said network comprising:
a plurality of neighboring communication nodes including a first node and a second node,
each node having a height,
said first node having a height greater than that of said second node,
said system being adapted to determine whether said second node has a downstream link, and
said system being further adapted to select a new height for said second node sufficient to reverse the direction of at least one link between said second node and said neighboring nodes if said second node has no downstream link.

9. A system as in claim 8, wherein said new height for said second node is greater than the height of at least one neighboring node.

10. A system as in claim 8, wherein said new height for said second node is greater than the height of the highest non-NULL neighboring node.

11. A system as in claim 8, wherein said new height for said second node is greater than the height of the lowest non-NULL neighboring node.

12. A system as in claim 8, wherein each node has a current time and local clock bias, and wherein said new height for said second node is the sum of said local clock bias for said second node and said current time at said second node.

13. A system as in claim 12, wherein upon a node becoming aware of a neighbor having a new height, said node updates said local clock bias as the larger of (a) said local clock bias or (b) the height of said neighboring node having said new height minus said current time at said node.

14. A system for routing in a network, said network comprising a plurality of neighboring communication nodes including a first node and a second node, each node having a height and a current time, said first node having a height greater than that of said second node;

said system adapted to determine whether said second node has a downstream link;

if said second node has no downstream link, said system further adapted to select a new height equal to said current time at said second node;

said system further adapted to determine whether said second node with said new height has a downstream link; and if said second node with said new height has no downstream link, said system being further adapted to select a new height for said second node sufficient to reverse the direction of at least one link between said second node and said neighboring nodes.

* * * * *